(12) United States Patent
Salmonsen et al.

(10) Patent No.: US 7,505,889 B2
(45) Date of Patent: Mar. 17, 2009

(54) TRANSCODING MEDIA SYSTEM

(75) Inventors: Daniel R. Salmonsen, Saratoga, CA (US); Gerard J. Cerchio, Sunnyvale, CA (US)

(73) Assignee: Zoran Corporation, Sunnyvale, CA (US)

( * ) Notice: Subject to any disclaimer, the term of this patent is extended or adjusted under 35 U.S.C. 154(b) by 1208 days.

(21) Appl. No.: 10/313,743

(22) Filed: Dec. 5, 2002

(65) Prior Publication Data

US 2004/0054689 A1 Mar. 18, 2004

Related U.S. Application Data

(60) Provisional application No. 60/409,630, filed on Sep. 9, 2002, provisional application No. 60/408,831, filed on Sep. 6, 2002.

(51) Int. Cl.
G06F 9/455 (2006.01)

(52) U.S. Cl. ......................... 703/23; 709/231

(58) Field of Classification Search .................. 703/24, 703/23; 709/231
See application file for complete search history.

(56) References Cited

U.S. PATENT DOCUMENTS

| | | | |
|---|---|---|---|
| 5,404,527 A | 4/1995 | Irwin et al. | |
| 5,557,790 A | 9/1996 | Bingham et al. | |
| 5,929,857 A | 7/1999 | Dinallo et al. | |
| 5,956,716 A | 9/1999 | Kenner et al. | |
| 5,974,547 A | 10/1999 | Klimenko | 713/2 |
| 5,995,512 A | 11/1999 | Pogue, Jr. | |
| 6,009,470 A | 12/1999 | Watkins | |
| 6,057,832 A | 5/2000 | Lev et al. | |
| 6,119,153 A | 9/2000 | Dujari et al. | 709/218 |
| 6,185,617 B1 | 2/2001 | Housel, III et al. | 709/227 |
| 6,192,471 B1 | 2/2001 | Pearce et al. | 713/2 |
| 6,211,901 B1 | 4/2001 | Imajima et al. | |
| 6,225,993 B1 | 5/2001 | Lindblad et al. | |
| 6,233,389 B1 | 5/2001 | Barton et al. | |
| 6,298,446 B1 | 10/2001 | Schreiber et al. | |
| 6,304,965 B1 | 10/2001 | Rickey | 713/2 |
| 6,327,652 B1 | 12/2001 | England et al. | |
| 6,330,670 B1 | 12/2001 | England et al. | |

(Continued)

FOREIGN PATENT DOCUMENTS

EP 08/37579 A 4/1998

(Continued)

OTHER PUBLICATIONS

Dongyan Xu et al., "Resource-aware configuration of ubiquitous multimedia services", Jul. 30, 2000 IEEE Conference on Multimedia and Expo, vol. 2, pp. 851-854.*

(Continued)

*Primary Examiner*—Paul L Rodriguez
*Assistant Examiner*—Russ Guill
(74) *Attorney, Agent, or Firm*—Lowrie, Lando & Anastasi, LLP

(57) ABSTRACT

A proxy subsystem for a media renderer comprises a network interface, a content transfer subsystem coupled to the network interface, a format transcoder coupled to the content transfer subsystem and capable of coupling to a rendering hardware. The proxy subsystem further comprises a connection manager service coupled to the content transfer subsystem and the format transcoder subsystem, and a rendering controller capable of coupling to the rendering hardware.

7 Claims, 14 Drawing Sheets

U.S. PATENT DOCUMENTS

| | | | |
|---|---|---|---|
| 6,345,279 B1 | 2/2002 | Li et al. | 707/104.1 |
| 6,353,173 B1 | 3/2002 | D'Amato et al. | |
| 6,353,460 B1 | 3/2002 | Sokawa et al. | |
| 6,353,892 B2 | 3/2002 | Schreiber et al. | |
| 6,372,974 B1 | 4/2002 | Gross et al. | |
| 6,407,680 B1 | 6/2002 | Lai et al. | |
| 6,446,073 B1 | 9/2002 | D'Amato et al. | |
| 6,449,367 B2 | 9/2002 | Van Wie et al. | |
| 6,463,530 B1 | 10/2002 | Sposato | |
| 6,557,041 B2 | 4/2003 | Mallart | 709/231 |
| 6,636,929 B1 | 10/2003 | Frantz et al. | 710/313 |
| 6,701,528 B1 | 3/2004 | Arsenault et al. | |
| 6,748,525 B1 | 6/2004 | Hubacher et al. | |
| 6,775,675 B1 | 8/2004 | Nwabueze et al. | |
| 6,792,323 B2 | 9/2004 | Krzyzanowski et al. | |
| 6,889,383 B1 | 5/2005 | Jarman | |
| 6,961,897 B1 | 11/2005 | Peel et al. | |
| 7,039,298 B1 | 5/2006 | Watkins | |
| 7,039,938 B2 | 5/2006 | Candelore | |
| 7,043,484 B2 | 5/2006 | Rotem et al. | |
| 7,088,398 B1 | 8/2006 | Wolf et al. | |
| 7,099,951 B2 * | 8/2006 | Laksono | 709/231 |
| 7,131,059 B2 | 10/2006 | Obrador | |
| 7,133,598 B1 | 11/2006 | Lin et al. | |
| 7,178,106 B2 | 2/2007 | Lamkin et al. | |
| 7,269,543 B2 | 9/2007 | Salmonsen et al. | |
| 2001/0007568 A1 | 7/2001 | Morris | 370/473 |
| 2001/0029525 A1 | 10/2001 | Lahr | |
| 2002/0023013 A1 | 2/2002 | Hughes et al. | |
| 2002/0049717 A1 | 4/2002 | Routtenberg et al. | |
| 2002/0054134 A1 | 5/2002 | Kelts | 715/788 |
| 2002/0082730 A1 | 6/2002 | Capps et al. | 700/94 |
| 2002/0101997 A1 | 8/2002 | Curtis et al. | 380/279 |
| 2002/0129096 A1 | 9/2002 | Mansour et al. | 709/203 |
| 2002/0129359 A1 | 9/2002 | Lichner | |
| 2003/0018796 A1 * | 1/2003 | Chou et al. | 709/231 |
| 2003/0045955 A1 | 3/2003 | Janik | |
| 2003/0097497 A1 | 5/2003 | Esakov | |
| 2003/0110236 A1 | 6/2003 | Yang et al. | 709/219 |
| 2003/0135859 A1 | 7/2003 | Putterman et al. | 725/78 |
| 2003/0191623 A1 | 10/2003 | Salmonsen | |
| 2004/0049797 A1 | 3/2004 | Salmonsen | |
| 2004/0054689 A1 | 3/2004 | Salmonsen et al. | |
| 2004/0136698 A1 | 7/2004 | Mock | |
| 2004/0153765 A1 | 8/2004 | Prifling | |
| 2005/0010950 A1 | 1/2005 | Carney et al. | |
| 2005/0113946 A9 | 5/2005 | Janik | 700/94 |
| 2005/0117910 A1 | 6/2005 | Foote et al. | |
| 2005/0125831 A1 | 6/2005 | Blanchard | |
| 2005/0257240 A1 | 11/2005 | Faulkner et al. | |
| 2005/0257241 A1 | 11/2005 | Faulkner et al. | |
| 2006/0010316 A1 | 1/2006 | Burokas et al. | |
| 2006/0026162 A1 | 2/2006 | Salmonsen et al. | |
| 2007/0005334 A1 | 1/2007 | Salmonsen | |

FOREIGN PATENT DOCUMENTS

| | | |
|---|---|---|
| EP | 0911728 | 4/1999 |
| EP | 10/49291 A1 | 11/2000 |
| WO | 95/24705 | 9/1995 |
| WO | WO-98/53411 | 11/1998 |
| WO | 01/67758 | 9/2001 |
| WO | WO 02/13487 A | 2/2002 |
| WO | WO 02056560 A | 7/2002 |
| WO | 03/073229 | 9/2003 |
| WO | 2006/019503 | 2/2006 |

OTHER PUBLICATIONS

Alan Lewis, MPEG-4 over Wireless Networks, 2000, www.arm.com/support/54EK6Q/?File/Video_WP.pdf,Cambridge, UK.

Anon., DIGITAL 5 NEWS, Zorand and Digital 5 Partner to Demonstrate Vaddis DVD Multimedia Processor and Netmedia in Wireless Home-Networked DVD Platform, Jan. 9, 2002, www.digital5.com/press 010902a.html, USA.

Tom Hite; Jean Moonen; John Ritchie, The Audio/Video Unified Specification Approach, UPnP Newsletter, Second Quarter, 2002, www.upnp.org/newsletters/newsletterVI/tech.asp, Microsoft Corporation, USA.

International Search Report for PCT/US03/05461 dated May 12, 2003.

Tanenbaum, Andrew, "Computer Networks", 1996, Third Edition, Prentice-Hall.

ATI, "All-in-one Wonder Radeon Users' Setup and Installation Guide", 2002, ATI Technologies Inc., pp. 1-55.

ATI, "ATI Multimedia Center 7.5", 2001, ATI Technologies Inc., pp. 1-102.

MSI, "694D PRO", Micro-Star Int'l Co., OCt. 20, 2000, pp. 1-3, http://web.archive.org./web/20001020133334/www.msicomputer.com/products/details.asp?ProductID=141.

Anon. John G. Spooner, IBM: Give hard drives the boot?,ZDNet UK News, 2002, http://news/zdnet.co.uk/cgi-bin/uk/printer_friendly.cgi?id=2111185, CNET Networks, Inc., UK.

Anon., ETHERBOOT, About Etherboot, 2002, http://etherboot.sourceforge.net/, EtherBoot.org., USA.

Anon., IBOOT, iBoot-Remote Boot over iSCSI, 2002 www.haifa.il.ibm.com/projects/storage/iboot/faq.html., IBM, Israel.

International Search Report for PCT/US03/05776 dated May 22, 2003.

International Search Report for PCT/US03/05777 dated Sep. 9, 2003.

International Search Report for PCT/US2003/05778 dated Sep. 29, 2005.

Invitation to Pay Additional Fees for PCT/US05/022045 dated Oct. 7, 2005.

International Search Report for PCT/US2005/022045 dated Sep. 23, 2005.

Written Opinion for International Search Report for PCT/US2005/022045 dated Sep. 23, 2005.

Meter Van R., et al. "Visa: Netstation's Virtual Internet SCSI Adapter" ACM Sigplan Notices, ACM, Association for Computing Machinery, New York, NY vol. 33, No. 11, pp. 71-80, Nov. 1, 1998.

European Search Report for Application No. 03713682.7, dated Jun. 2, 2008.

* cited by examiner

TRANSCODING MEDIA SYSTEM

RELATED APPLICATIONS

This application claims priority under 35 U.S.C. § 119(e) to U.S. Provisional Application Ser. No. 60/408,831 filed on Sep. 6, 2002 and U.S. Provisional Application Ser. No. 60/409,630 filed on Sep. 9, 2002. This application claims the benefit under 35 U.S.C. § 120 of U.S. application Ser. No. 10/084,403 filed on Feb. 25, 2002, now U.S. Pat. No. 7,269,543. The disclosed system and operating method are related to subject matter disclosed in the following co-pending patent applications that are incorporated by reference herein in their entirety: (1) U.S. Pat. No. 7,209,874, entitled "Emulator-Enabled Network Connectivity to a Device"; (2) U.S. patent application Ser. No. 10/313,782, entitled "Network to Computer Internal Interface"; (3) U.S. patent application Ser. No. 10/313,536, entitled "Network Interface to a Video Device"; (4) U.S. patent application Ser. No. 10/313,539, entitled "Video Receiver/Recorder with Computer Interface"; (5) U.S. patent application Ser. No. 10/313,850, entitled "Computer System Capable of Executing a Remote Operating System"; (6) U.S. patent application Ser. No. 10/313,538, entitled "Communication Architecture Utilizing Emulator Interface"; and (7) U.S. patent application Ser. No. 10/314,374, entitled "Server in a Media System".

BACKGROUND OF THE INVENTION

In many industries and applications, highly complex devices or appliances exist that perform a single function or only a few functions but have processing, storage and display capabilities that could greatly extend functionality if exploited. Examples of these devices and appliances include televisions, digital video cassette recorders, digital versatile disk players, audio receivers, point-of-sale terminals, process controllers and valves, vending machines, alarm systems, home appliances, and many more. Computational power and capabilities of the devices increases as technology evolves and additional software solutions become available, improving user and customer services and experiences with successive product generations. The devices and appliances typically have a dedicated function and unique architecture and, generally, are not designed for interaction with other device or model types, or even with others of the same device.

Technological advances have created availability of a vast amount of information that is accessible by computer networks such as intranets, local area networks, wide area networks, and the internet. The networks enable easy access to information throughout the world and facilitate information delivery world-wide in the form of text files, data, motion pictures, video clips, web pages, flash presentations, shareware, computer programs, command files, and other information. One obstacle to access and delivery of information is lack of interoperability and resource management among devices.

Another difficulty with media systems is that media content is supplied, encoded, and transmitted in a wide variety of formats in multiple video, audio, and combined modalities, as well as single frame or moving picture content.

SUMMARY OF THE INVENTION

According to one embodiment of a disclosed system, a proxy subsystem for a media renderer comprises a network interface, a content transfer subsystem coupled to the network interface, a format transcoder coupled to the content transfer subsystem and capable of coupling to a rendering hardware. The proxy subsystem further comprises a connection manager service coupled to the content transfer subsystem and the format transcoder subsystem, and a rendering controller capable of coupling to the rendering hardware.

According to other embodiments, a method of transcoding media content for renderer comprises receiving video/audio data streams, initiating content transfers by creating a navigation logfile that contains a frame identification and a related group of picture lists with file offsets, selectively transferring, manipulating, and buffering audio and video streams and encoding the data frames.

In some embodiments, the emulator interface can analyze content communications to determine supported content formats, determine the format of presented content, and reformat or transcode the content to place the presented content in the supported format. In a particular example, the emulator interface can monitor traffic on a bus and analyze the traffic for commands and responses to determine the supported format. The emulator interface can then convert content received from an external source in an unsupported format to the supported format.

In accordance with other embodiments, a video system comprises a video display, a decoder coupled to the video display that decodes video information in a native format, a network controller capable of coupling to an external network, and a transcoder. The transcoder is coupled to the decoder and to the network controller. The transcoder can manipulate data and control signals into compliance with the native format, receive network information in a format different from the native format from the external network, and supply the network information in the native format to the decoder.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION

What are desired are systems, devices, and methods that enable intercommunication and information sharing among devices and appliances. What are also desired are systems and techniques for converting media content among a wide variety of formats and modalities for display in real-time.

A PC proxy based subsystem includes a format transcoder so that media renderer supports any format that PC can transcode. The subsystem transcodes a variety of data formats for network interface so that a renderer, for example an MPEG decoder, can receive and decode multiple varieties of signal types. In one example, software transcodes content to VCD or DVD format from other encoded formats. In some examples, PC resources are used to download and transcode content for streaming playback on TV using MPEG decoder from DVD player.

The PC proxy based subsystem includes an emulator interface that can be distributed among the media renderer and PC in various proportions to emulate an existing device, for example to add network connectivity without change to the device. The emulator interface can emulate a device at a logical level as well as a physical level.

Figure 1:
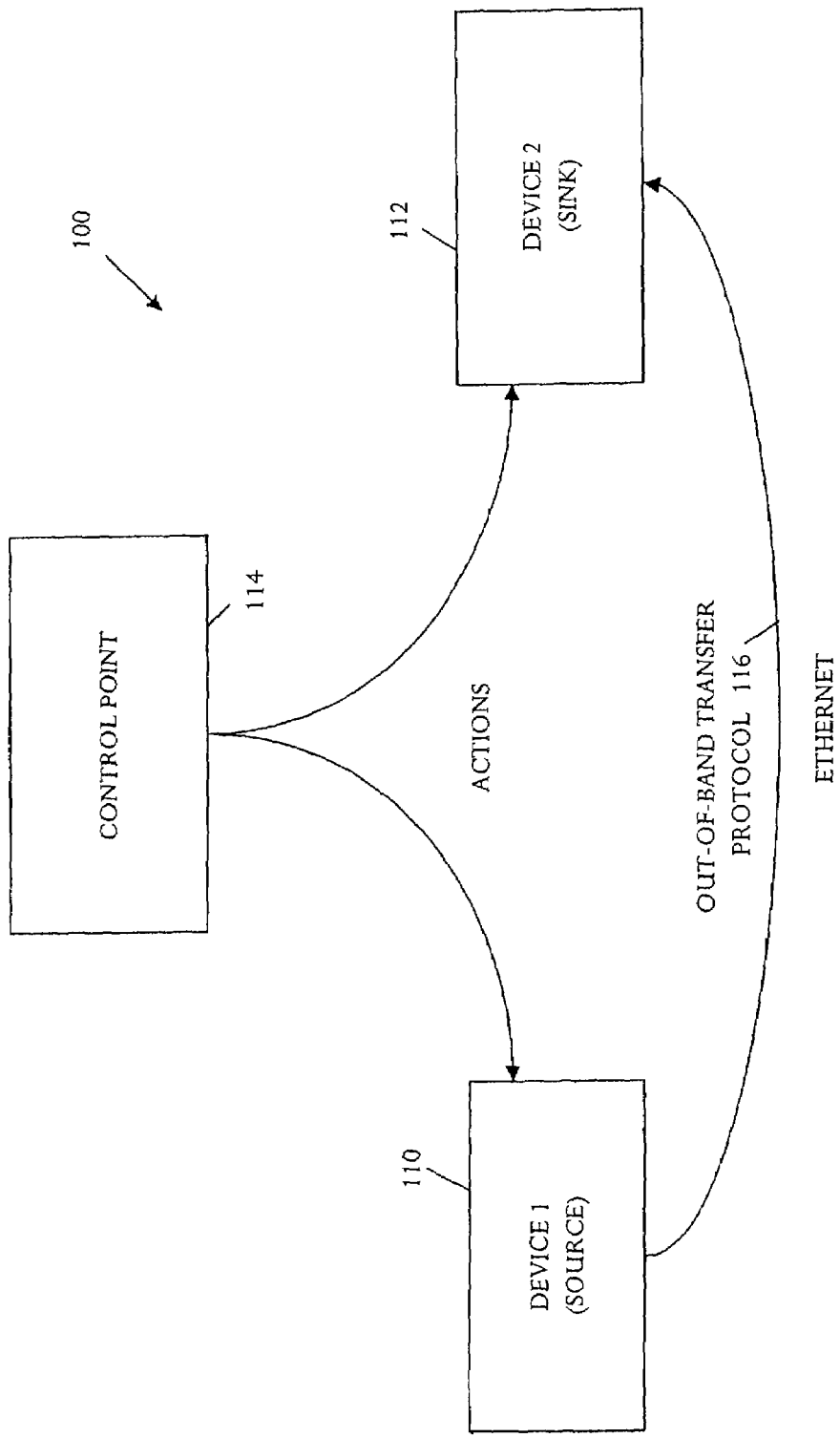
FIG. 1 is a schematic block diagram showing an example of a device interaction model that can utilize an emulator interface.

Referring to FIG. 1, a schematic block diagram shows an example of a device interaction model 100 that can utilize an emulator interface. The device interaction model 100 defines general interactions between many different types of devices and controllers. Various devices and controllers may be computers, workstations, laptop computers, calculators, palm computers, mobile telephones, televisions, electronic picture frames, video cassette recorders, compact disk (CD) or digital versatile disk (DVD) players and recorders, CD-ROM drives (R/RW), jukeboxes, karaoke devices, camcorders, set-top boxes, audio systems, MP3 players, still-image cameras, remote control devices, control panels, and any other control devices and information storage, retrieval, and display devices. The device interaction model 100 includes a source 110, a sink 112, and a controller 114. A particular device or controller can be configured variously as any of the source 110, the sink 112, and the controller 114. Other interactions models can be used. Some may omit or integrate the controller 114. A particular device or controller can function as any of the source 110, the sink 112, or the controller 114 in a particular interaction. A particular device or controller can function as more than one of the source 110, the sink 112, and the controller 114 in a particular interaction or configuration.

The source 110 can be any device capable of supplying information or content of any type including audio, video, or any type of coded information. In various embodiments, the source 110 can supply content of one or more types under various video standards such as Motion Pictures Expert Group (MPEG2, MPEG4), picture standards including Joint Photographic Experts Group (JPEG), and audio standards including MPEG-1 Audio Layer-3 (MP3). The source 110 also can supply content under other standards such as Windows Media Architecture (WMA), bitmaps (BMP), National Television Standards Committee (NTSC), Phase Alteration Line (PAL), Sequential Couleur avec Memoire (SECAM), Advanced Television Systems Committee (ATSC), video compact disk (VCD) and S-VCD standards, Power Point (PPT), karaoke functions, features such as MP3 or progressive scan display, and emerging new functionality.

The controller 114 initiates content transfer by configuring the source 110 and sink 112 so that selected content flows from the source 110 to the sink 112 using a suitable transfer protocol 116. Supported transfer protocols 116 include one or more of broadband, IEEE-1394 high-speed serial bus, International Electrotechnical Commission (IEC-61883) Standard that describes: Isochronous Plug Control Registers, Connection Management Protocol (CMP), Function Control Protocol (FCP), Common Isochronous Packet (CIP) headers, Hypertext Transfer Protocol (HTTP GET/PUT/POST), Real-time Transport Protocol (RTP), Transmission Control Protocol/Internet Protocol (TCP/IP), IEEE 802 wireless standards, and others.

In various embodiments, the sink 112 can be any device capable of rendering content. Typical sink 112 devices include MPEG decoders, DVD recorders, televisions, with an embedded MPEG decoder, personal video recorders (PVRs), audio systems and other devices. In the illustrative device interaction model 100, content from a content source 110 can be selected through the controller 114 based on rendering capabilities of the sink 112 and transferred from the source 110 to the sink 112 for rendering.

The emulator interface can emulate an existing device, functioning in any capacity as a source 110, sink 112, or controller 114, for example to add network connectivity without change to the device. The emulator interface can emulate a device at a logical level as well as a physical level.

In some embodiments, the emulator interface can analyze content communications to determine supported content formats, determine the format of presented content, and reformat or transcode the content to place the presented content in the supported format. In a particular example, the emulator interface can monitor traffic on a bus (for example, an IDE bus) and analyze the traffic for commands and responses to determine the supported format. The emulator interface can then convert content received from an external source in an unsupported format to the supported format.

Figure 2:
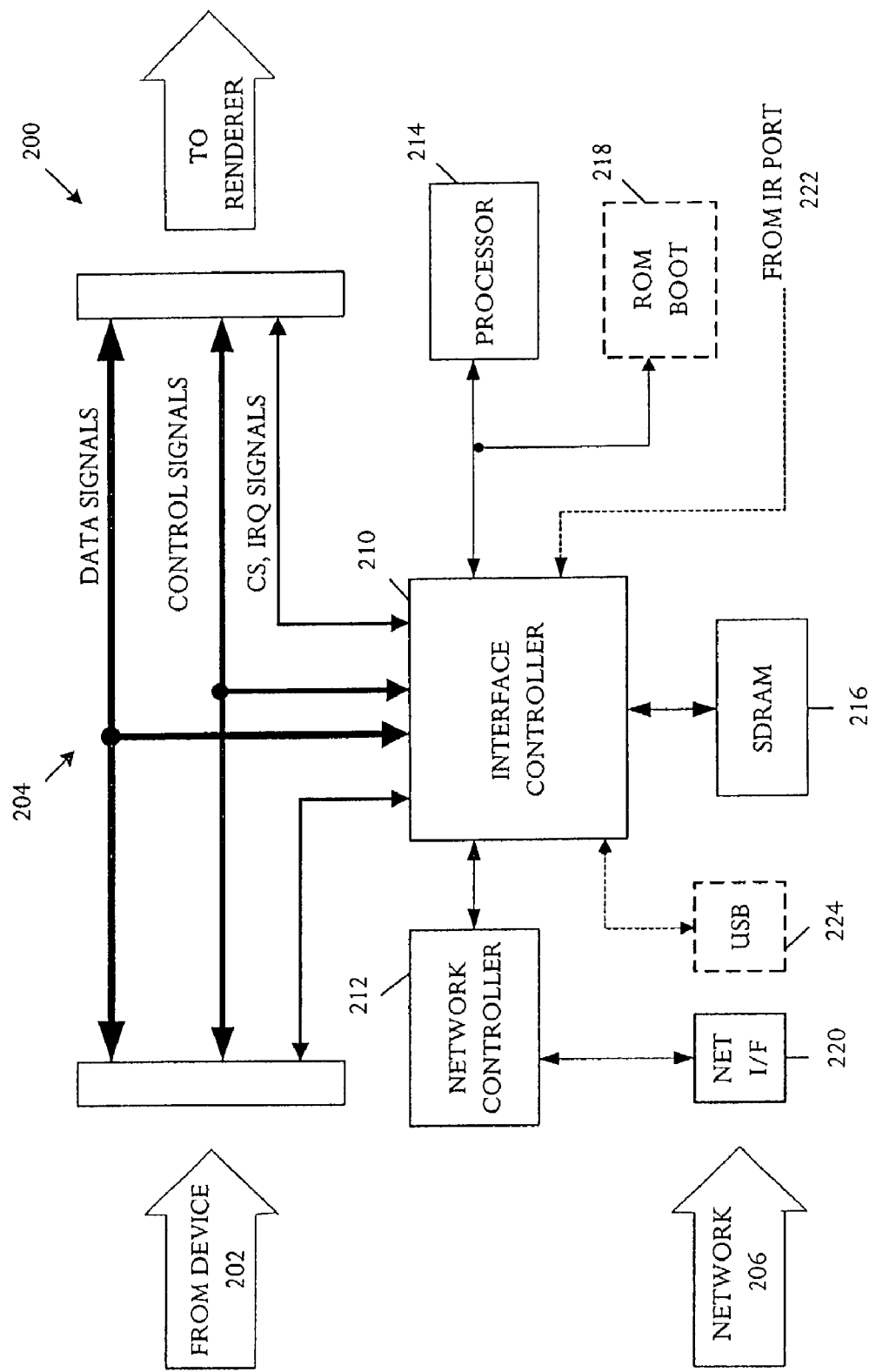
FIG. 2 is a schematic block diagram that illustrates an example of a suitable emulator interface for connecting a device or bus to a network.

Referring to FIG. 2, a schematic block diagram illustrates an example of a suitable emulator interface 200 for connecting a device 202 or bus 204 to a network 206. The illustrative emulator interface 200 comprises an interface controller 210 that is capable of coupling the emulator interface 200 to the device 202 or bus 204, an network controller 212 that is capable of coupling the emulator interface 200 to the network 206, and a processor 214. The processor 214 is capable of executing various processes, methods, or programs to transfer information between the network 206 and the device 202 or bus 204 and to perform a wide variety of other functions. The emulator interface 200 may include other optional functional blocks such as a volatile memory 216 and nonvolatile memory 218 that may be coupled to the interface controller 210. The volatile memory 216, for example synchronous dynamic random access memory (SDRAM), may be used to store information such as temporary control information, transferring data in various formats, and others. The nonvolatile memory 218, for example a bootstrap read-only memory (ROM), may be used to store executable function code such as a bootstrap load program and other operational functions, and operating parameters.

A network connector 220, for example a RJ45 connector, can couple the network controller 212 to the network 206.

The interface controller 210 can also support additional communication links. In the illustrative example, the interface controller 210 has a radio frequency communication link 222 and a universal serial bus (USB) link 224.

The emulator interface 200 integrates network communication capabilities into a device 202 or into a system that utilizes the bus 204. In various embodiments, the emulator interface 200 can support 10/100 Ethernet media access control (MAC) protocol, serial ports, parallel ports, memory controllers, direct memory access (DMA), and parallel I/O. In some examples, the emulator interface 200 can interface with other processors, devices or components via a register interface or shared RAM interface.

The processor 214 can be any suitable processor, microprocessor, controller, microcontroller, central processing unit, digital signal processor, state machine, or the like. One example of a suitable processor is a chip-internal Reduced Instruction Set Computer (RISC) such as a selected member (for example, ARM7, ARM9, ARM9E, ARM10) of the Advanced RISC Machines (ARM) from Advanced RISC Machines (ARM) Ltd., Cambridge, UK. The ARM7 processor includes a RISC stand-alone core, instruction/data cache, write buffer, and pre-fetch control (none shown) and has an internal bus structure that enables program execution from cache while the internal bus is performing DMA data transfer operations to efficiently handle communication operations.

In some embodiments, the Network controller 212 has two modules, and network front end (not shown) and a media access control (MAC) module (not shown), for example for both 10 and 100 Mbit applications. The network front end maintains the MAC interface and includes transmit and receive first-in-first-out (FIFO) buffers, DMA interface logic, and control/status registers for MAC, transmitter, and receiver. In one example, the transmit FIFO and receive FIFO have capacities of 128 bytes and 2048 bytes, respectively. The transmit FIFO allows a portion of the transmit buffer to remain on the FIFO while collisions occur on the network medium, avoiding multiple buffer fetches from memory. The receive FIFO is large to allow an entire frame to be received and wait in the FIFO during byte count analysis to determine an optimum buffer description for DMA transfer.

The MAC module interfaces between the network front end and I/O pins, and supports ENDEC (10 Mbit) and Media Independent Interfaces (MII) under firmware control. Functions performed by the MAC module include 100 Mbit Ethernet MAC, MII management function, address filtering, statistics gathering, and an optional 100 Mbit physical coding layer.

The interface controller 210 supplies an interface between the emulator interface 200 and a device 202 or bus 204, supporting one or more of five interface types, for example including an IEEE 1284 host port, a 16-bit shared RAM interface, an 8-bit shared RAM interface, a 16-bit FIFO interface, and an 8-bit FIFO interface. The IEEE 1284 mode supports commercial network printer server applications as a bridge between a local area network (LAN) and up to four external devices using the 1284 Parallel Port interface. The shared memory interface supplies up to 64K of shared RAM between the emulator interface 200 and a bus 204. The FIFO interface supplies a data streaming FIFO interface between the emulator interface 200 and the bus 204 or device 202. In an illustrative example, the FIFO interface supports two 32-bit FIFOs, one for each data direction.

The interface controller 210 contains a functional element that operates as a memory controller (not shown) to interface to memory devices such as flash, static Random Access Memory (RAM), dynamic RAM (DRAM), EEPROM, and others. The memory controller functions in cooperation with a bus controller (not shown) to transfer data between the bus 204 and a memory. The memory controller typically supports various types of DRAM including fast page mode (FD) DRAM, synchronous DRAM (SDRAM), and EDO DRAM. Generally a single application utilizes the same style of DRAM.

The interface controller 210 may include a bus controller (not shown) that moves data to and from the bus 204. In some embodiments, the bus controller supports dynamic bus sizing for selected logical addresses. The bus controller can perform system bus arbitration for interfaces with an external bus master or CPU. The bus controller operates in conjunction with the memory controller to access devices 202 using the bus 204.

In some embodiments, the interface controller 210 may also support a serial controller (not shown). For example, the interface controller 210 may include two independent universal asynchronous/synchronous receiver/transmitter (UART) channels, each with a programmable bit-rate generator. The UARTs realize relatively low-speed information transfer between the emulator interface 200 and a device 202 using a standard protocol.

In some embodiments, the serial controller of the interface controller 210 can support a High Level Data Link Control (HDLC) protocol that forms a data link layer for wide area networking (WAN) models such as Frame Relay, ISDN, and SDLC. In the HDLC mode, the interface controller 210 uses a zero insertion/deletion "bit-stuffing" protocol to transmit layer 2 data frames over point-to-point links, broadcast networks, packet networks, or circuit switch networks with CRC field error detection.

In some embodiments, the serial controller of the interface controller 210 can support a Serial Peripheral Interface (SPI) protocol that defines a full-duplex, synchronous, character-oriented data channel between master and slave devices using a four-wire interface. The master interface operates in broadcast mode with the slave interface activated using a select signal. The SPI operation mode converts simple parallel/serial data to stream serial data between memory and a peripheral.

In various embodiments, the interface controller 210 may also include one or more components including programmable timers with interrupt support, programmable bus-error timers, programmable watch-dog timers, programmable parallel I/O ports with interrupt support, a system priority interrupt controller, and a controller for other miscellaneous system control functions.

Figure 3:
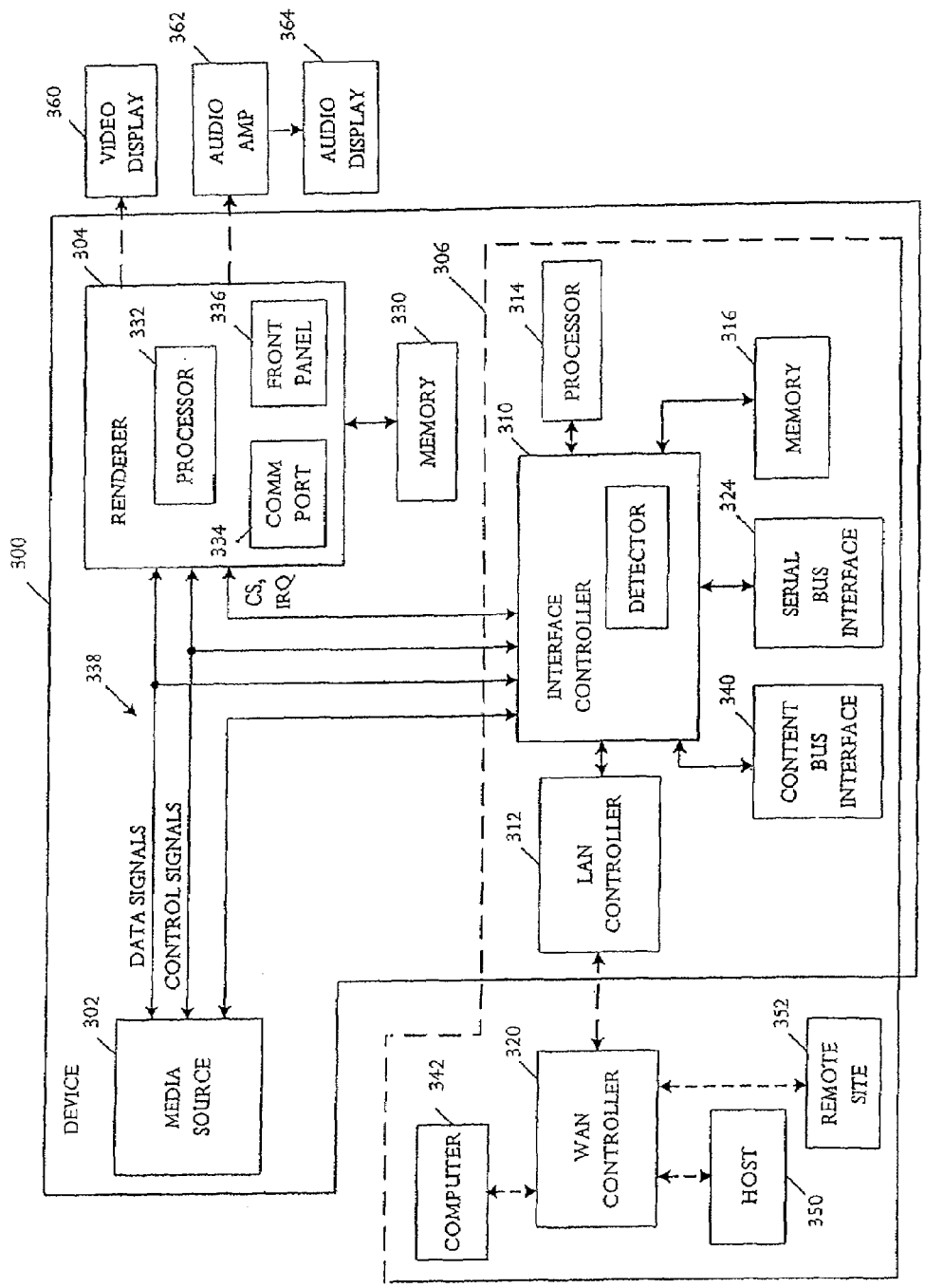
FIG. 3 is a detailed system block diagram showing an example of a device that utilizes an emulator interface.

Referring to FIG. 3, a detailed system diagram shows an example of a device 300 that utilizes an emulator interface 306. In one example, the device 300 is a video player and/or recorder such as a Digital Versatile Disc (DVD) player or DVD player/recorder. The device 300 comprises a content source 302, a content sink 304, and an emulator interface 306. The content source 302 supplies information or media content for presentation on the content sink 304.

In some examples, the content source 302 can be an audio and/or video device subsystem such as a DVD drive, CD drive, or CD-ROM drive (CD-R, CD-R/W). In a specific example, the content source 302 may include an integrated DVD/CD digital signal processor (DSP), servo and block decoder with advanced error detection and correction schemes for improved playability.

The content sink 304 is typically a device that processes the content for presentation, for example, a rendering device. In one example, the content sink 304 can be an MPEG decoder that decodes audio and/or video content for display. In a particular example, the content sink 304 may include an integrated DVD backend that combines an MPEG-2 video decoder; 24-bit audio digital signal processor (DSP); 32-bit reduced-instruction-set-computer (RISC) system CPU. The particular content sink 304 may further include an advanced 32-bit on-screen display (OSD) with hardware 2D graphical user interface (GUI) acceleration for superior user-interface performance and quality; and PAL/NTSC video encoder with a progressive scan option for high-definition TV (HDTV)-ready systems. Major audio features in the specific example include support for multi-channel MPEG, Dolby Digital and Digital Theatre Systems (DTS), as well as High Definition Compatible Digital (HDCD™) and MP3 decode, in addition to post processing functions such as karaoke and 3D sound.

In the illustrative device 300, the content sink 304 is coupled to a memory 330. The illustrative content sink 304 comprises several functional blocks including a sink processor 332, a communications port 334 such as a serial port, and a display panel 336. The sink processor 332 can be any type of suitable processor, microprocessor, controller, microcontroller, digital signal processor, state machine, central processing unit, or the like. The communications port 334 may typically receive control signals from a communication device (not shown) such as a remote control unit. The display panel 336 typically includes various types of user interface controls such as an alpha-numeric pad, volume control buttons, switches, pads, joysticks, or other function selection keys.

In the illustrative device 300, the content source 302 communicates with the content sink 304 via a communication bus 338 that carries data signals, control signals, chip select signals, interrupt request signals, and the like. In various systems, the communication bus 338 may be a nonstandard bus or may be one or more of several various standard, typically parallel, buses from among Integrated Device Electronics (IDE), audio/visual (A/V), advanced technology attachment packet interface (ATAPI), Small Computer Systems Interface (SCSI), or other buses. In some embodiments, the communication bus 338 may be a physical interface to the media access control (MAC) module.

The emulator interface 306 can be coupled to the communication bus 338 to communicate with a network and send network information to the sink and/or source in a manner that emulates a source-sink interaction. Although terminology of content source 302 and content sink 304 indicate a particular direction of content transfer, in various device implementations and/or interactions either the content source 302 or the content sink 304 may be an ultimate receiver of content. For example, a device 300, a DVD player, may include an MPEG decoder as a content sink 304, emulator interface 304 can manage content selection and communication direction so that either the content source 302, for example a DVD drive, or an external network or device sources the content. In another example, a personal video recorder (PVR) or DVD recorder device 300 may have an MPEG encoder content source, a writeable DVD drive or hard disk drive, that often operates as a content source, but may function as a content sink or renderer when the device 300 is in a recording mode. In the PVR or DVD recorder example, the content source 302 performs a network-attached storage function in which the writeable DVD or hard disk drive functions as a recordable drive or the DVD or hard disk drive storage can be omitted and content can be delivered to or from a computer or network.

In the illustrative embodiment, the emulator interface 306 comprises an emulator interface controller 310, a network controller 312, a processor 314, a memory 316, a serial bus interface 324, a content bus interface 340, and in some embodiments, processes executed on a processor such as a computer 342, host 350, or remote source 352.

The processor 314 executes various processes, methods, or programs that control operations of the emulator interface controller 310 to transfer information between a network external to the device 300 and the content source 302 or communication bus 338 and to perform a wide variety of other functions. The processor 314 can be any suitable processor, microprocessor, controller, microcontroller, central processing unit, digital signal processor, state machine, or the like.

The emulator interface controller 310 is capable of coupling the emulator interface 306 to the device 300 or communication bus 338, and manages the generation and/or transmission of data signals, control signals, chip select, interrupt request signals, and the like. The emulator interface controller 310 may include a detection circuit for detecting presence of a communications port, such as an infrared (IR) or radio frequency (RF) port. In various examples, the detection circuit may comprise hardware, software, firmware, or a combination. Upon determination that a communications port is present, the detection circuit then can determine whether commands or control signals are issued from a remote device to the device 300 via the communications port.

The emulator interface controller 310 may be implemented in any suitable technology such as a field programmable gate array (FPGA), an integrated circuit, a discrete circuit, a programmable circuit, or any other type of circuit.

The emulator interface controller 310 communicates bi-directionally with the memory 316.

The illustrative emulator interface controller 310 is also coupled to the network controller 312 that may be a local area network controller or other suitable network controller. The network controller 312 forms an interface between the device 300 and one or more networks, such as local area networks. The emulator interface controller 310 may also be connected to a wide area network, for example the internet, via a network connection 320, such as a wide area network connection. The network connection 320 facilitates operation of the device 300 with any computer network standard, for example with broadband and modem standards. In some embodiments, a computer 342, such as a host computer, workstation, control terminal, and the like, may be connected to the device 300 via the network controller 312. Alternatively, the computer 342 may be connected to the device 300 via the network connection 320. The device 300 may be coupled via the network connection 320 to a network that comprises a plurality of device subsystems, for example A/V device subsystems, and other media elements. Alternatively, the device 300 may retrieve information from one of the plurality of device subsystems.

The content bus interface 340 enables the device 300 to communicate with a variety of other devices and device types. For example, the content bus interface 340 may enable connection to one or more of local area network (LAN) cards, a Universal Serial Bus (USB), an IEEE 1394 standard compatible bus, an Audio/Visual (A/V) bus, a Small Systems Interconnect Bus (SCSI), a cable modem, a digital camera, a video camcorder, a Personal Digital Assistant (PDA), or any other device that produces electronic signals.

The serial bus interface 324 enables the device 300 to interface with a variety of other devices and device types, for example, user interface devices such as a mouse, a keyboard, joystick, trackpad, or other input devices. Media elements from any devices coupled to the content bus interface 340, the serial bus interface 324, or any of the communication buses 338 may be retrieved or delivered to the content sink 304 to be processed, and then to be displayed.

In some examples, data signals may communicate between the content source 302 and the content sink 304. Data signals may also communicate between the content source 302 and the emulator interface controller 310, or between the content sink 304 and the emulator interface controller 310 via data lines of the communication bus 338. Control signals may also communicate between the content source 302 and the emulator interface controller 310, or between the content sink 304 and the emulator interface controller 310 via control lines of the communication bus 338. Various other control signals and interrupt request signals may communicate bi-directionally between the content source 302 and emulator interface controller 310, or between the content sink 304 and the emulator interface controller 310.

Media content may be stored on the content source 302, for example an optical disc drive (DVD or CD type), in a computer such as a host computer 350 or a computer at a remote network site 352. In one transaction example, the sink processor 332 of the content sink 304 receives content located on either of the content source 302, the host computer 350, or on a remote network site 352 under control of the emulator interface 306. The received data may be completely or partially processed, or unprocessed, before transmission to the content sink 304. In a specific class of devices, the received content can be in a format native to the content source 302 or a format that the content sink 304 is capable of processing. For a specific device in this class, the content source 302 can be a DVD player, a supported content format may be MPEG 2 DVD format, MPEG VCD format, MPEG 2 Super VCD format, or any DVD compliant format. The media content can be communicated directly to the content sink 304, which transcodes the data, then forwards the transcoded data for display, for example video information on a video display 360 and/or audio information amplified by audio amplifier 362 and displayed on audio display 364. One example of an audio display 364 is a speaker.

If the content has a format that is not native to the content sink 304, a format that the content sink 304 is not configured to process, or if the content does not comply with frame rate requirements, the host computer 350 can decompress the content prior to forwarding to the content sink 304. In either case, the emulator interface 306 can convert the data to a displayable format. An example of a noncompliant format that may require format conversion is a DVD, player in which content has an MPEG 4 format, Real Networks format, or MPEG1/MPEG2 format.

In various embodiments, applications, and examples, the device 300 performs various functions of information storage, processing, monitoring, and display. The functions are executed by control and management elements such as the sink processor 332, the processor 314, the host computer 350, other computational and control devices in the remote network site 352, or in other computational, management, and control elements inside and outside the device 300. The control functions may be implemented as software, firmware, either individually or in combination. Executable program code can be stored in a processor-readable medium or transmitted by a computer data signal embodied in a carrier wave over a transmission medium or transmitted by a data signal in a carrier wave over a transmission medium or communication link. The processor-readable medium or machine-readable medium may include any medium that can store or transfer information. Examples of processor or machine-readable media include electronic circuits, semiconductor memory devices, read-only memory (ROM), floppy diskette, CDRW-ROM, DVDRW-ROM, optical disk, hard disk, fiber optic media, radio frequency (RF) signals, and the like. A computer data signal may comprise any signal that can communicate over a transmission medium such as electronic network channels, optical fibers, air, electromagnetic signals, RF links, serial links (e.g. IEEE 1394 high-speed serial bus), powerline, wireless (e.g. IEEE 802 Standards Working Groups, Bluetooth), wired, and the like. Executable program code segments may be downloaded via communication or computer networks such as internet, intranet, and local area networks (LANs), wide area networks (WANs), and the like.

A suitable application for the device 300 is a home networking system. A personal computer can be coupled to a home networking system that includes at least one audio/visual device. Content may be located on a machine-readable medium that may be read by the personal computer or the audio/visual device, on one or more storage devices such as DVD drive, CD drive, hard disk drive or other drives, contained within the personal computer, the audio/visual device, or on a remote network site 352 accessible through the network.

In an illustrative application, the device 300 enables operational control to a user by presenting a graphical user interface (GUI), such as a menu of selected actions or options, typically on the video display 360 but also possibly on display screens associated with the host computer 350, a console of the device 300, or a display in the remote network site 352. For example, the sink processor 332 may request display of a menu in respond to a signal or request from the user. The emulator interface controller 310 receives the request, determines which functional element stores information for presenting the display, and retrieves the presentation information for display. Typically, the menu information can be stored in memory 330, memory 316, a memory associated with the host computer 350, or another computer on the remote network site 352, or a divided and spread among a plurality of storage locations in conjunction with one or more of the processors. The GUI also includes functional elements that permit the user to select from the menu, for example selection buttons, keys, or other types of switches of a remote control, console, or other input terminal of one or more of the interacting devices.

According to the menu selection, if a selected item is available in the device 300, the emulator interface 306 can issue a command to the content source 302 to deliver a media element corresponding to the selected item to the content sink 304. If the selected item is stored in association with the host computer 350, the emulator interface 306 signals the host computer 350 to deliver the requested content to the content sink 304. Similarly, if the requested content is available elsewhere on a remote network site 352, the emulator interface 306 issues a request to transfer requested content from the remote network site 352. The emulator interface 306 can enforce priority or resolve contention for resources in a network that contains multiple content sources and multiple content requestors.

Control interface or translation functionality can be implemented typically in the processor 314 or the host computer 350, but may otherwise be supported from a device on a remote network site 352. Control interface or translation enables the content sink 304 or host computer 350 to receive and/or process content for delivery to the home entertainment system or to a display device. Control interface or translation functionality may include transcoding or formatting information for content distribution, data format conversion, digital rights management conversion, and content protection. The host computer 350 or device 300 may monitor compliance with permission for receiving the content. Format conversion functionality includes content conversion, meta data conversion, digital rights management conversion. Processor 314 may facilitate or assist decryption of received data.

In some embodiments, the host computer 350 can operate as a content server. Server software can be executable on the host computer 350 and execute a content formatting operation. The server may include software that searches for content, and upon finding content determines the format of the content. If necessary, the server transcodes the content to a suitable format for a renderer. The server complies with multiple content format conventions and creates seamless communication of various types of computing and communication devices. Software searches for content, upon finding content creates a menu, displays the menu, and transcodes the signals. Specific software functionality includes a menu control structure that is enables a user to select content for rendering, and content formatting to place information in a format capable of rendering by the existing system. Software communicates with the content sink 304 in a particular way that is expected by the content sink 304.

Server software can be executable on various types of computing devices including computers, PCs, laptops, palmheld devices, set-top boxes, remote control devices, mobile telephones, and the like can access any type of video content and serve as a navigator for supplying the video content to the content sink 304. The software exploits the infrastructure of existing devices, such as DVD players and drives, to conform the format of video content to a known native format. Accordingly, server software can conform video data in any format to a format supported by the content sink 304 with no changes to the content sink 304.

In various embodiments, the host computer 350 may implement code that is executable on any suitable processor, for example on the host computer 350 or on the emulator processor 314. For device flexibility, functionality can be supplied from the host computer 350. For example, the emulator interface 306 can send all commands to the host computer 350 and software in the host computer 350 can execute various server, transcoding, control, and processing operations based on the commands.

In other examples, various processes may be executed in the emulator processor 314 for various reasons such as capability of real-time processing and avoidance of large content transfers between processors. Flexibility, capability to upgrade, and reduction in executable code storage in the emulator processor 314 can be achieved by downloading executable code from the host computer 350 to the emulator memory 316 for execution on the emulator processor 314. For example, the emulator interface 306 can include a small, simple executable code in nonvolatile memory in the emulator memory 316 to perform basic input/output and management functions, and execute most functionality from code downloaded in volatile memory 316 from an device such as the host computer 350.

In some examples, content may be communicated in open format, allowing general access without digital rights management. Digital rights management capabilities can be included in the emulator, for instance executed by the processor 314, so that content becomes compliant with a digital rights management scheme.

Transcoding is a functionality performed by the device 300, host computer 350, or other processor communicatively coupled to the device 300 that converts content to a compatible format. If received content is compatible with the device 300, the content forwards directly to the device 300 without conversion. Otherwise, for incompatible content, the host computer 350, processor 314, or other control functional element internal or external to the device 300 can convert the content to a format that is compatible with the device 300.

When the selected media content is available, the emulator interface 306 forwards the media element to the content sink 304. The device 300 can format the media element to a form suitable for a particular display such as a television screen, speakers, or the like.

In some examples, the content sink 304 may include functionality to interpret users commands issued via remote control or appliance control panel.

Figure 4:
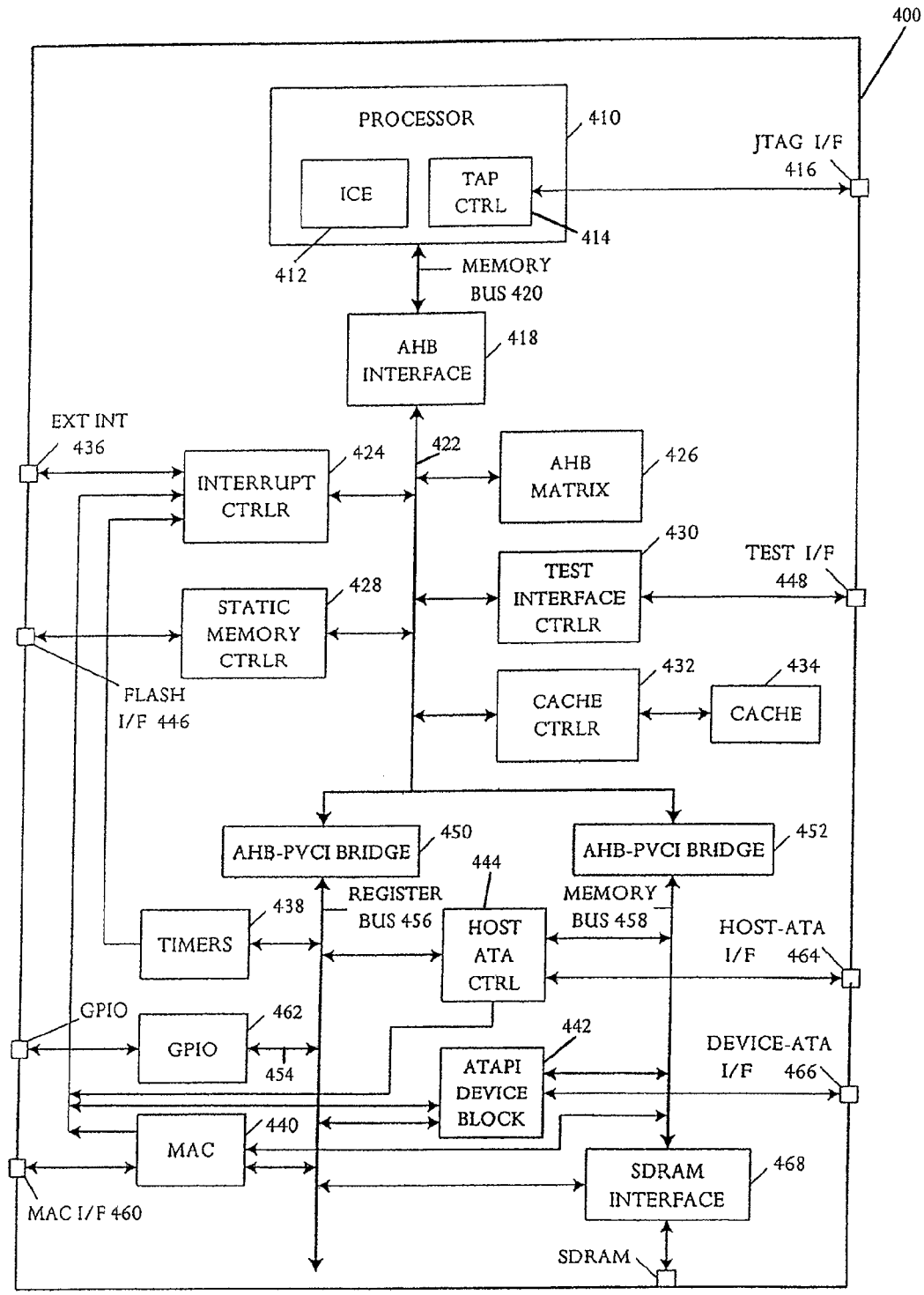
FIG. 4 is a detailed block diagram that depicts functional blocks of an emulation circuit that is suitable for usage in the emulator interface of FIGS. 2 and/or 3.

Referring to FIG. 4, a detailed block diagram depicts functional blocks of an emulation circuit 400 that is suitable for usage in the emulator interface of FIGS. 2 and/or 3. In some embodiments, the emulation circuit 400 can be implemented as a field programmable gate array, although other technologies may otherwise be used. The emulation circuit 400 includes a processor 410 that can be programmed to execute various functions including control, data transfer, emulation, transcoding, data storage, interface, test, and others. In an illustrative embodiment, the processor 410 can be implemented as an ARM7TDMI-S manufactured by Advanced RISC Machines, United Kingdom. The illustrative processor 410 further includes an in-circuit emulator 412 and a Test Access Port (TAP) controller 414.

The in-circuit emulator 412 can support real-time debug with trace history around a trigger point, debugging of foreground tasks simultaneous with background task execution, and modification of memory during runtime. In-circuit emulator 412 can also support multiple processors and mixed architecture devices, slow or variable-frequency designs, and debug of very low-voltage cores.

The TAP controller 414 is coupled to a JTAG interface 416, enabling the processor 410 to execute JTAG emulation that allows the processor 410 to be started and stopped under control of connected debugger software. JTAG emulation allows a user to read and modify registers and memory locations, set breakpoints and watchpoints, and support code download, trace, and monitoring for debug operations.

The processor 410 and an AHB bus interface 418 communicate on an ARM memory bus 420. The AHB bus interface 418 communicatively couples the processor 410 to a multi-layer Advanced Microcontroller Bus Architecture (AMBA™) high-speed bus (AHB) 422. AHB matrix 426 is also coupled to the AHB 422. The AHB matrix 426 is a complex interconnection matrix to attain parallel paths to memory and devices on the multi-layer AMBA™ high-speed bus (AHB) 422. The parallel paths of the AHB 422 increase bus bandwidth and lower latencies by reducing contention. Multi-layer AHB 422 is an interconnection technique based on AHB protocol that supports parallel access between multiple master and slave devices.

Devices coupled to the AHB 422 include an interrupt controller 424, a static memory controller 428, a test interface controller 430, a cache controller 432, an AHB to PVCI bridge 450, and an AHB to BVCI bridge 452. The interrupt controller 424 is capable of detecting interrupt signals from multiple sources including an external interrupt connection 436, timers 438, a media access control (MAC) module 440, an ATAPI device block 442, and a host ATA control block 444. The interrupt controller 424 asserts an appropriate bit identifying an interrupt on the processor 410 upon the occurrence of one or more interrupt signals. In various applications, the current highest priority interrupt can be determined either by software or hardware. Typically, the current highest priority interrupt is read from a set of registers in the interrupt controller 424. The interrupt controller 424 contains registers indicative of interrupt status, and registers for enabling and setting interrupts.

The static memory controller 428 is coupled to a flash memory interface 446, typically for supplying program code that is executable on the processor 410 although data and other information can also be supplied to the emulation circuit 400.

The test interface controller 430 is coupled to a test interface 448 and supports external bus interface request and grant handshake signals for requesting test interface access to an external bus and information of external bus use grant, respectively. In a typical system, the processor 410 may continually request access to an external bus with the test interface controller 430 having highest priority to bus access. In a typical sequence of events to apply test patterns, first reset is asynchronously applied and synchronously removed. On reset removal, processor 410 initiates a memory read via the static memory controller 428. The static memory controller 428 typically requests the external bus and reads the bus when the request is acknowledged. When the static memory controller 428 is busy, the test interface controller 430 can request the external bus. The request is granted because the test interface controller 430 has the highest priority and the test interface controller 430 takes ownership of the external bus. When the static memory controller 428 finishes the read access, the test interface controller 430 is granted use of the external bus. The external bus resolves the bus request signals and the test interface controller 430 initiates a test pattern sequence.

The cache controller 432 is coupled to a cache memory 434, illustratively 4 kB of static RAM. The cache memory 434 reduces external memory accesses and increases performance even with usage of relatively low-speed RAM. The cache memory 434 allows processor 410 to share bus bandwidth with multiple devices with high data throughput such as streaming audio and video devices.

The AHB to PVCI Bridge 450 couples Peripheral Virtual Component Interface (PVCI) functional blocks to the AHB 422. The AHB to PVCI bridge 450 can include both master and slave interfaces and supports AHB Master to PVCI Slave and PVCI Master to AHB Slave modes. The PVCI standard enables development of plug-in components that are compatible with numerous interfaces, promoting design efficiency. In the illustrative example, PVCI devices coupled to a register bus 456 include timers 438, MAC module 440, a general purpose input/output interface 454, ATAPI device block 442, and host ATA control block 444.

The AHB to BVCI Bridge 452 couples Basic Virtual Component Interface (BVCI) functional blocks to the AHB 422. The Basic Virtual Component Interface (BVCI) is a system bus interface to a memory bus 458. In the illustrative example, BVCI devices coupled to the AHB to BVCI bridge 452 include the host ATA control block 444, the ATAPI device block 442, and a synchronous dynamic RAM (SDRAM) interface 468.

Timers 438 can be programmed to time various events under program control. The processor 410 controls operation of timers 438 through signals communicated to timer registers via the register bus 456. The timers 438 can generate timer interrupts that can redirect program execution through operation of the interface controller 210.

The emulation circuit 400 receives and sends data or information by operation of the general purpose input/output interface 454 that is coupled between the register bus 456 and a GPIO interface 462.

In the illustrative emulation circuit 400, the MAC module 440 is a 10/100-MBPS Ethernet media access controller for networking highly integrated embedded devices. The MAC module 440 is coupled to an external network interface 460, as well as to the register bus 456 and the memory bus 458. The MAC module 440 is an interface to physical layer devices and can support 10-BaseT, 100-BaseTX, 100-BaseFX, and 32-bit standards-based BVCI bus interface with an integrated direct memory access (DMA) controller. The MAC module 440 is typically IEEE 802.3 compliant and supports half- and full-duplex operation with collision detection, auto-retry, flow control, address filtering, wakeup-on-LAN, and packet statistics. MAC module 440 can incorporate a DMA buffer-management unit and support wire-speed performance with variable packet sizes and buffer chaining. MAC module 440 can offload processor tasks including such direct register access and programmable interrupts to improve high data throughput with little processor overhead. The MAC module 440 can generate interrupts and includes an interrupt signal connection to the interrupt controller 424.

The host ATA control block 444 and the ATAPI device block 442 are coupled to the register bus 456 and the memory bus 458, and operate in combination to facilitate connectivity between a host controller and hard disk drives in various applications including computing, communication, entertainment, peripheral, and other applications. The host ATA control block 444 includes digital circuitry to form a complete ATA host subsystem to integrate hard disk, CD-ROM, DVD, DVD-R, and other host subsystems. The host ATA control block 444 implements functionality for drive control and enables the emulation circuit 400 to operate as a host. When the emulator 400 functions as a host to control a storage drive the host uses functionality of host ATA control block 444 and host ATA interface 464. The host ATA control block 444 can also implement programmed input-output (PIO), multiple-word direct memory access (DMA), and various speed, for example 33, 66, 100, and 133 megabyte/second, interface circuitry. In various embodiments, the host ATA control block 444 can support multiple ATA/ATAPI devices. The host ATA control block 444 is coupled to a host ATA interface 464 for connecting to a host computer and has an interrupt connection to the interrupt controller 424 so that the processor 410 can address host ATA interface events.

The ATAPI device block 442 is coupled to a device ATA interface 466 and connects an Integrated Device Electronics (IDE) storage device to a host system. The ATAPI device block 442 typically performs command interpretation in conjunction with the embedded processor 410. The ATAPI device block 442 implements functionality of storage drive emulation, enabling the emulation circuit 400 to function as a storage drive. An external device can operate as a host that uses the emulation circuit 400 as a drive. The ATAPI device block 442 can be used to communicate with hard disk drives as well as solid-state storage devices using dynamic RAM (DRAM), NAND, or NOR flash memory devices, and the like. In various embodiments, the ATAPI device block 442 can be designed to interface to one or more of various size (for example 1", 1.8", and 2.5") hard disk drives, low-power drives, portable drives, tape drives, and solid-state or flash drives. The ATAPI device block 442 has an interrupt connection to the interrupt controller 424 so that the processor 410 can address device ATA interface events.

The host ATA interface 464 can be logically connected to the device ATA interface 466. In one example, the emulation circuit 400 can function as a MPEG decoder communicating directly with a storage drive. In a pass through operation, the emulator circuit 400 can monitor commands sent to a storage drive passively.

The SDRAM interface 468 is an interface controller that supports interconnection of the emulation circuit 400 to synchronous dynamic RAM modules in various configurations, for example DIMM, without supporting circuitry. The SDRAM interface 468 typically includes a SDRAM controller (not shown) and a SDRAM configuration block (not shown). The SDRAM controller generates control signals for controlling the SDRAM. The SDRAM configuration block includes configuration registers for controlling various entities such as refresh and mode lines, and a refresh timer for usage by the SDRAM controller. In various embodiments, the SDRAM interface 468 SDRAM) interface 468 can support slave devices, arbitrary length bus transfers, and programmability.

Figure 5:
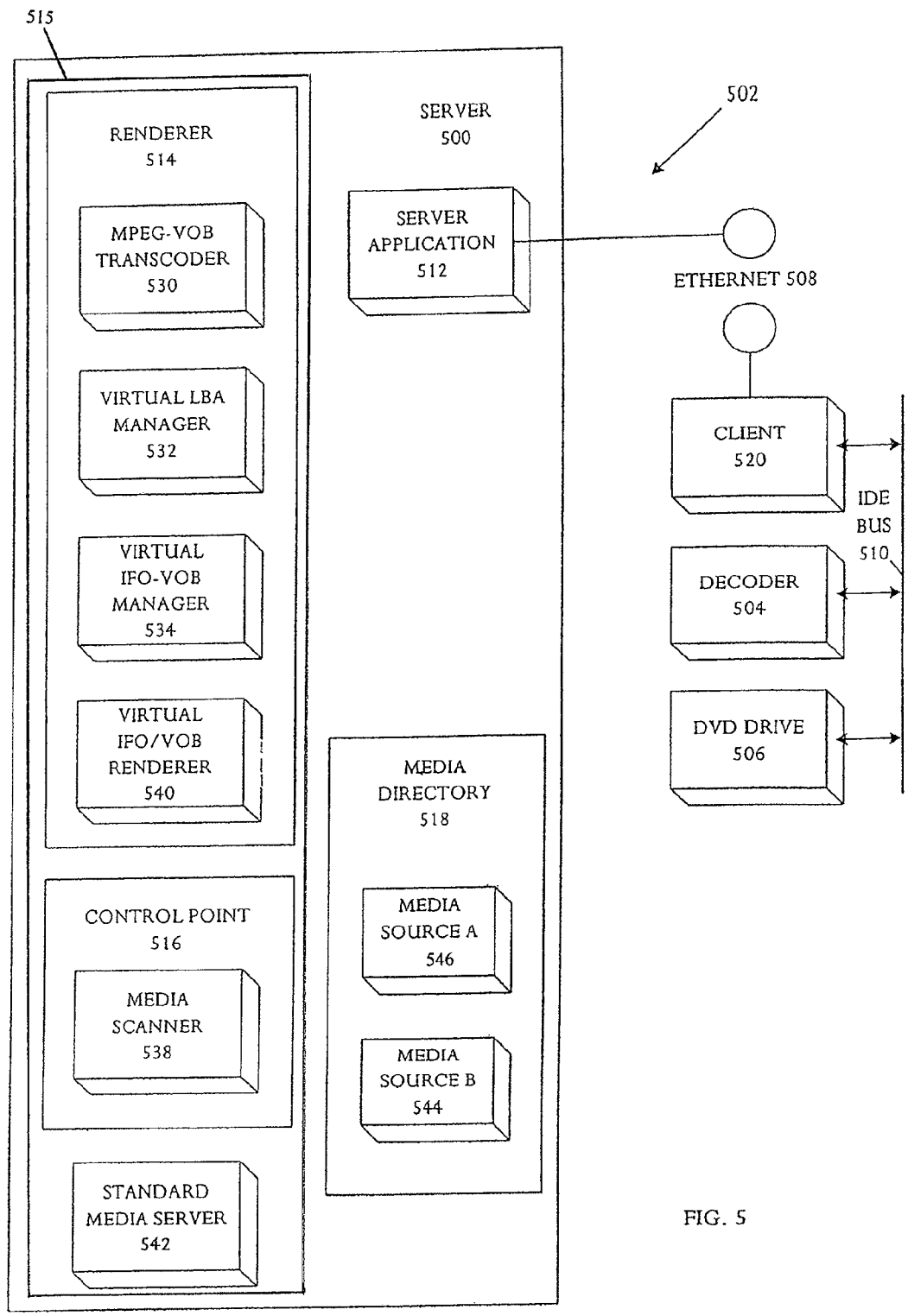
FIG. 5 is a component diagram showing various system, hardware, and software components of a server for usage with an emulator interface.

Referring to FIG. 5, a component diagram shows various system, hardware, and software components of a server 500 for usage with an emulator interface. The illustrative server 500 is capable of executing on a system 502 such as a computer, a personal computer, workstation, laptop, palmheld computer, notebook computer, or any other type of device for executing programmed code. The server 500 can communicate with one or more various information handling devices, including devices that function as a source or information or content, devices that display, perform, or render the sourced information or content, and control devices. In the illustrative example, the server 500 is configured to communicate with a client device 520, a decoder 504 such as an MPEG decoder, and a DVD drive 506 via an Ethernet connection 508. These devices are for illustration only and can be supplemented or replaced by many other types of information handling devices. The client device 520, the decoder 504, and the DVD drive 506 are each shown in a single system coupled by an IDE bus 510. In other examples, the devices may be configured in different systems and may have internal interfaces different than the IDE bus 510.

The server 500 includes one or more server applications 512 that execute in conjunction with an audio-visual (AV) system 515 and a media directory 518 to manage interactions among a variety of audio-visual devices and controllers. The server 500 communicates with the devices over the Ethernet connection 508 by operation of a server application 512, for example a software application that executes a desired content handling application. A server application 512 virtualizes media into a volume of data that is navigable by the system 515. The server application 512 can assess characteristics of source media and, if needed, modify characteristics into a more familiar form. For example, a DVD-based server 500 may change data format to appear more as a DVD disc. The server application 512 manages data streaming to one or more of multiple clients that may be connected to the server 500.

Generally, the server application 512 controls the information transfer entities and the type of processing. The server application 512 determines and selects devices that function as the content source and renderer, the type of processing performed on the content, and any control and management functionality. For example, the server application 512 can initially generate a graphical user interface display indicative of the types of content available for performance and classes of processes that can be performed on the content. A user can respond to the display by selecting the desired content and processing. The server application 512 can generate and send control signals to the selected content source and renderer that commence content accessing, transmission, rendering, and display. The server application 512 can generate and send control signals that activate devices, if any, in the path from source to renderer that process or modify the content. In some applications, the server application 512 can execute content processing routines that are suitably executed on the server processor.

The AV system 515 defines and manages general interactions among various types of audio-visual devices and supports a broad range of device configurations and applications independently of device type, content format, and data transfer protocols. For example, the AV system 515 can support an open-ended variety of audio-visual devices including, but not limited to, computers, PCs, laptops, palm-held computers, cellular telephones, workstations, video displays, electronic picture frames, televisions, CD/DVD players and jukeboxes, video cassette recorders, set-top boxes, camcorders, still-image cameras, audio systems, stereos, MP3 players. The AV system 515 can support an open-ended broad variety of content, information, and data formats including, but not limited to, Motion Pictures Expert Group (MPEG2, MPEG4), Joint Photographic Experts Group (JPEG), audio standards including MPEG-1 Audio Layer-3 (MP3), Windows Media Architecture (WMA), bitmaps (BMP), National Television Standards Committee (NTSC), Phase Alteration Line (PAL), Sequential Couleur avec Memoire (SECAM), Advanced Television Systems Committee (ATSC), video compact disk (VCD) and S-VCD standards. The AV system 515 selects and defines functionality of various content sources, content renderers, and controllers in combination with a server application 512 and the media directory 518.

The AV system 515 comprises a media renderer 514, a media controller 516, and a standard media server 542. The AV system 515 defines and manages interactions among a content source, a content renderer, and an AV interaction controller. In some embodiments, the AV system 515 can be highly flexible and compatible with any type of media source device and any type of media rendering device.

The server 500 accesses content from one or more media sources 544 and 546 from the media directory 518. The media controller 516 enables a user to locate and select content from the media directory 518 and to select a target renderer. The media renderer 514 obtains the selected content and directs transfer of the content to the selected target renderer.

In the illustrative example, the media renderer 514 includes a transcoder 530, a virtual logical block address (LBA) manager 532, a virtual content file manager 534, and a virtual content renderer 540. In one embodiment, the transcoder 530 is an MPEG to video object block (VOB) transcoder and the virtual content file manager 534 is a virtual IFO/VOB manager. The MPEG-VOB transcoder converts from an MPEG format that is commonly used to compress and display video content for computer handling to VOB files that are the standard format of DVD presentations and movies. VOB files contain multiple multiplexed audio/visual streams. The virtual IFO/VOB manager handles VOB files and information format (IFO) files containing information that describes the particular format of VOB files including playing information such as aspect ratio, subtitles, menus, languages, and the like.

The server 500 can include transcoders and virtual content file managers that transcode information in other formats depending on the particular audio-visual application. For example, a transcoder 530 can be implemented that transcodes content to and from various formats including one or more of MPEG video, Digital Video (DV), MPEG elementary (ES) or program streams (VOB), YUV4MPEG streams, NuppelVideo file format and raw or compressed (pass-through) video frames and export modules for writing DivX, OpenDivX, DivX 4.xx or uncompressed AVI files with MPEG, AC3 (pass-through) and PCM audio. One example of a particularly useful transcoding application is transcoding of JPEG to MPEG. In another example, digital video can be transcoded to MPEG including transcoding of low quality digital video to high quality MPEG.

In an audio example, the transcoder 530 can transcode an MP3 media file to a Dolby AC3 pulse-coded modulation (PCM) format.

In a DVD player application, the transcoder 530 can transcode any transcribable media for viewing on a DVD player. For example, a power-point presentation can be transcoded to a video presentation on a DVD player.

The transcoder 530 executes decoding and encoding operations using content loading modules including import modules that feed transcode with raw video/audio streams and export modules that encode data frames. A typical transcoder 530 supports elementary video and audio frame transformations, including video frame de-interlacing or fast resizing and external filter loading. Various operations performed by the transcoder 530 include demultiplexing, extracting, and decoding of source content into raw video/audio streams for import, and probing and scanning of source content to enable post-processing of files, setting file header information, merging multiple files or splitting files for storage.

In a typical transaction, the transcoder 530 is activated by a user command and initializes content transfer, activating modules that begin transfer and buffering of audio and video streams and encoding frames. For example can initiate transfers by creating a navigation logfile that contains the frame and related group of picture list with file offsets. The transcoder 530 then executes one or more video/audio frame manipulations or simply passes through raw frame data without manipulation. Video frame manipulations may include removing an arbitrary frame region for processing, de-interlacing a video frame, enlarging or reduction of video width or height, filtering for image resizing, removing an arbitrary frame region for encoding, and downsampling of video width/height. Other video manipulations may include video frame flipping or mirror imaging, gamma correction, anti-aliasing, or color manipulations. Audio frame manipulations may include volume changes, audio stream resampling, and synchronizing video and audio frames.

The transcoder 530 can load export modules for audio/video encoding and begin an encoder loop operation that started for the selected frames.

The virtual LBA manager 532 controls definition and accessing of virtual logical block addresses in the media and relates the virtual logical block addresses to physical storage addresses of the media. By creating virtual logical block addressing, the virtual LBA manager 532 enables access to content from a variety of different content sources in the manner of a particular physical source. In this manner, the virtual LBA manager 532 enables a first device, for example a nonstandard or nontypical device, to emulate a second device, for example a device that normally supplies content within a system, using logical block addressing. In a particular example, the virtual LBA manager 532 can emulate addressing of DVD player content from content acquired from the Internet.

The virtual content manager 534 operates in conjunction with the virtual LBA manager 532 to dictate a map of physical addresses to virtual block addresses. The virtual content manager 534 tracks all elements of content data and maintains links among associated data including local data links and remote data links. Storage on the server 500 is in the configuration of multiple linked lists among files that reference one another. The virtual content manager 534 maintains links among files, identifying and positioning on one or more media volumes. The virtual content manager 534 verifies and ensures that the IFO file references are maintained to assure consistency of references at a directory and volume management level.

The virtual content manager 534 functions to handle storage and accessing of media content in the manner that a virtual memory manager operates in a computer. A virtual memory manager tracks chunks of memory. The virtual content manager 534 tracks chunks of media. The virtual content manager 534 enables multiple chunks of media to be stored with overlapping addressing.

The virtual content manager 534 receives commands from the media controller 516 that initiate or modify accessing and presentation of content. The virtual content manager 534 responds by determining the format of IFO and VOB files and activating the virtual LBA manager 532 and transcoder 530, if needed, to begin media streaming. The virtual content manager 534 also functions in conjunction with the virtual content renderer 540 to perform media rendering.

The virtual content renderer 540 operates on media files to format media to meet the functionality and capabilities of a presentation device, such as a DVD player.

In an illustrative embodiment, the virtual content renderer 540 is a virtual IFO/VOB renderer. The virtual content renderer 540 manipulates content data according to directions by the virtual content manager 534 to render content. The virtual content renderer 540 manipulates content data elements, supplying information to files identified and located by the virtual content manager 534. The virtual content renderer 540 also creates IFO files for media that do not already have IFO files including creation of selection trees that appear as cascading menus. IFO files are used to play various files including presentation of menus. Menus are a selection presentation for clusters of media. The virtual media renderer 540 can generate multiple menus in a tree structure until all media is accessible. The virtual content renderer 540 creates IFO files as a manifestation of a playlist structure.

Other examples of media that do not have IFO files are MPEG from digital video or other a myriad of other sources such as power point data for slide shows.

In some applications, the virtual content renderer 540 adds content that would not exist without rendering for presentation. For example, the virtual content renderer 540 can configure JPEG images and add filling content to create a slide show of MPEG images to generate slide-show functionality.

The illustrative media controller 516 includes a media scanner 538. In an illustrative embodiment, the media controller 516 allows monitoring of how the media is evolving through operation of the media scanner 538.

The media scanner 538 tracks the media directory 518, enabling media content and the media directory 518 to be mutable. The media scanner 538 regularly accesses the media directory 518 to determine whether any changes in the content of the media directory 518 have occurred and changing virtual structures in the media renderer 514 and the server application 512 to track changes in the media. The media scanner 538 monitors for changes and responds to any changes by updating virtual structures.

The standard media server 542 can access a variety of content, either locally stored or stored on an external device. The standard media server 542 is capable of accessing content and transferring the accessed content to another device via a network using a standard transfer protocol, for example HTTP or FTP. The standard media server 542 can locate content available on a network from a variety of devices and communicates with the media controller 516 to enable browsing or searching for available content items. The standard media server 542 typically includes a content directory, a connection manager, and a transporter. The content directory includes functions that interact with the media controller 516 to search or browse for content, supplying information and properties that specifically identify the content. The connection manager manages connections associated with a particular device including preparation for content transfer, issue of flow control commands, distinguishing of multiple instances to support multiple renderers, and terminating connections when a transfer is complete. The transporter can be used to operate in conjunction with the media controller 516 to control content flow. The standard media server 542 can supply media that does not require large changes for accessibility by conventional rendering hardware.

The media directory 518 is a media container, holding a list of all available media content and possibly some or all of the media content. The media directory 518 operates as a virtual media directory, enabling and facilitating access to locally-stored media content and remote media contained by other servers and devices. The media directory 518 stores Uniform Resource Identifiers (URIs) that identify content resources. URIs includes WWW addresses, Universal Document Identifiers, Universal Resource Identifiers, and combinations of Uniform Resource Locators (URL) and Names (URN). Uniform Resource Identifiers are formatted strings that identify a resource by name, location, or another characteristic. The media directory 518 holds URIs of all files that the server 500 can deliver for rendering. The URIs can correspond to files stored anywhere.

The media directory 518 identifies available content sources, for example media sources 544 and 546, and contains directory information to facilitate acquisition of content from one or more of the media sources.

Figure 6:
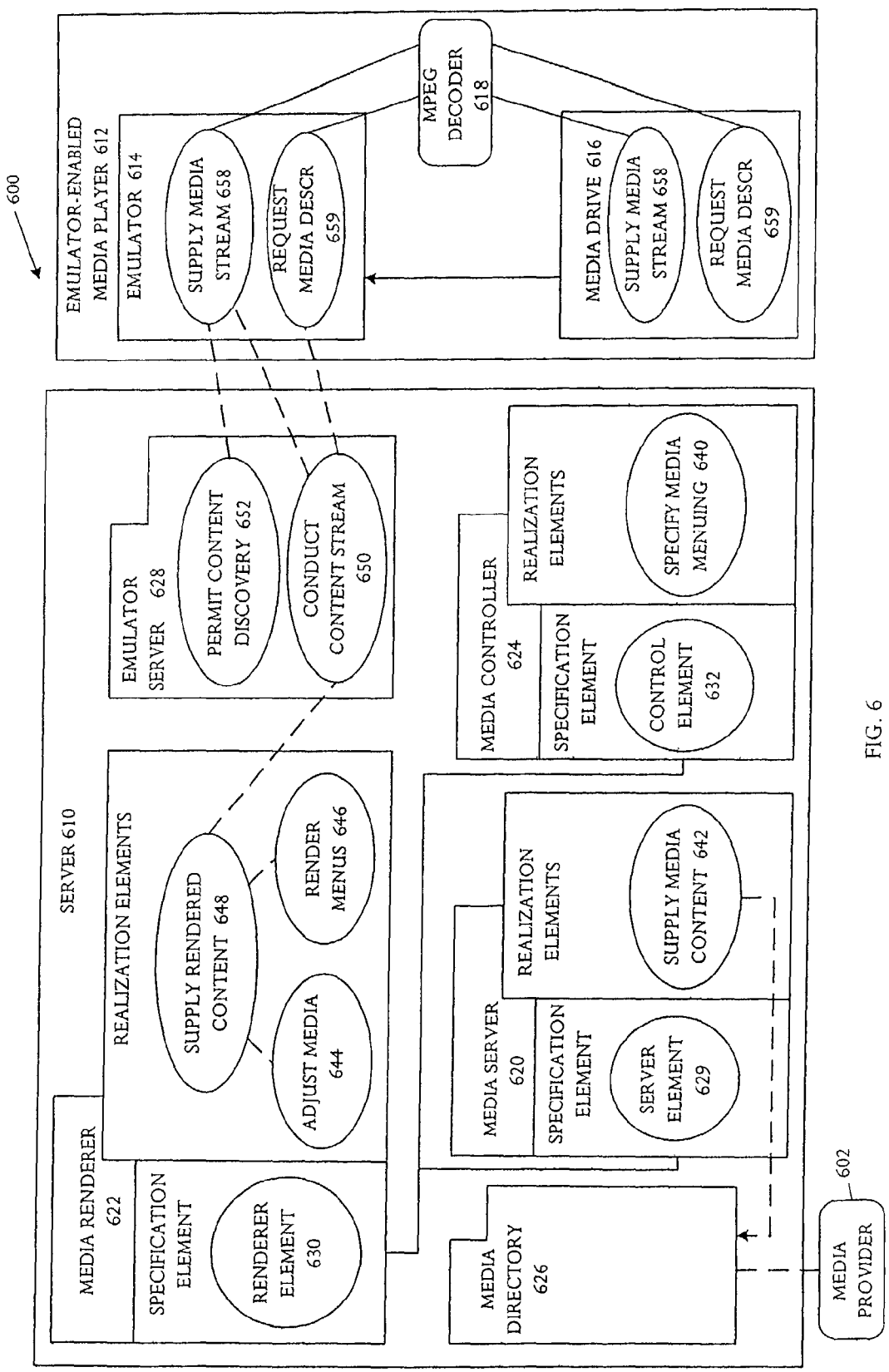
FIG. 6 is a use case diagram that illustrates functionality of an audiovisual system that uses an emulator interface.

Referring to FIG. 6, a use case diagram illustrates functionality of an audio-visual system that uses an emulator interface. The audio-visual system 600 includes a server 610 that is capable of executing on a processor and an emulator-enabled media player 612. The server 610 manages accessing and streaming of content to the emulator-enabled media player 612. The emulator-enabled media player 612 receives content from the server 610 and performs or presents the content. In a particular embodiment, the audio-visual system 600 can be a video system that plays video content from multiple sources on an emulator-enabled DVD player.

The server 610 has several functional blocks including a media server 620, a media renderer 622, a media controller 624, a media directory 626, and an emulator server 628. The media server 620, the media renderer 622, and the media controller 624 contain specification elements, respectively a server element 629, a renderer element 630, and a control element 632. The specification elements comply with standard communication protocols.

The media controller 624 and the media renderer 622 include specialized control operations and rendering operations, respectively. For example, the media controller 624 includes control functionality to select, enable, initiate and manage emulated interactions. The media renderer 622 includes a specialized renderer that is a proxy for the emulator network communications server 628. The media controller 624 communicates with the media server 620 and the media renderer 622 to initialize a source to supply content, set content transfer parameters, and begin content delivery. Media structure requests are sent to the media controller 624, and the media controller 624 sends control signals causing the media server 620 to transmit media files to the media renderer 622 including functional elements in the media renderer 622 that activate the emulator media stream.

The media controller 624, which may be termed a control point, examines the media directory 626, and specifies media menuing 640, for example DVD menuing, creating menus in the media directory 626 concurrently with content transfer. The media directory 626 contains some or all media content along with a list of available content for producing and displaying menus. A media provider 602 makes media available to the media directory 626.

The media server 620 receives control signals from the media controller 624 and responds by supplying media content 642 for rendering. The media renderer 622 receives the control signals and adjusts the media to the emulated standard 644. The media renderer 622 can render media player menus 646 for presentation of the menu by the emulator-enabled media player 612. The media renderer 622 receives and renders the content, supplying the rendered content 648 to the emulator server 628.

The emulator server 628 functions as an interface between the media renderer 622 and the emulator-enabled media player 612. The emulator server 628 conducts the media content stream 650 from the media renderer 622 to the emulator-enabled media player 612 and receives control information from the emulator-enabled media player 612 to permit discovery of available content 652.

In an illustrative example, the emulator-enabled media player 612 includes an emulator 614, a media drive 616, and a content sink device 618. In a particular example, the media drive 616 can be a DVD drive and the content sink device 618 can be an MPEG decoder. Functions performed by the emulator 614 mirror, or emulate, the functions of the media drive 616. In standard operation, the media drive 616 supplies a media stream 654 to the content sink device 618 and requests a media description 656. The emulator 614 emulates functions of the media drive 616, supplying an emulated media stream 658, and requesting a media description 659.

The emulator 614 can use automatic Internet Protocol (IP) addressing to allocate reusable network addresses and configuration options.

Figure 7:
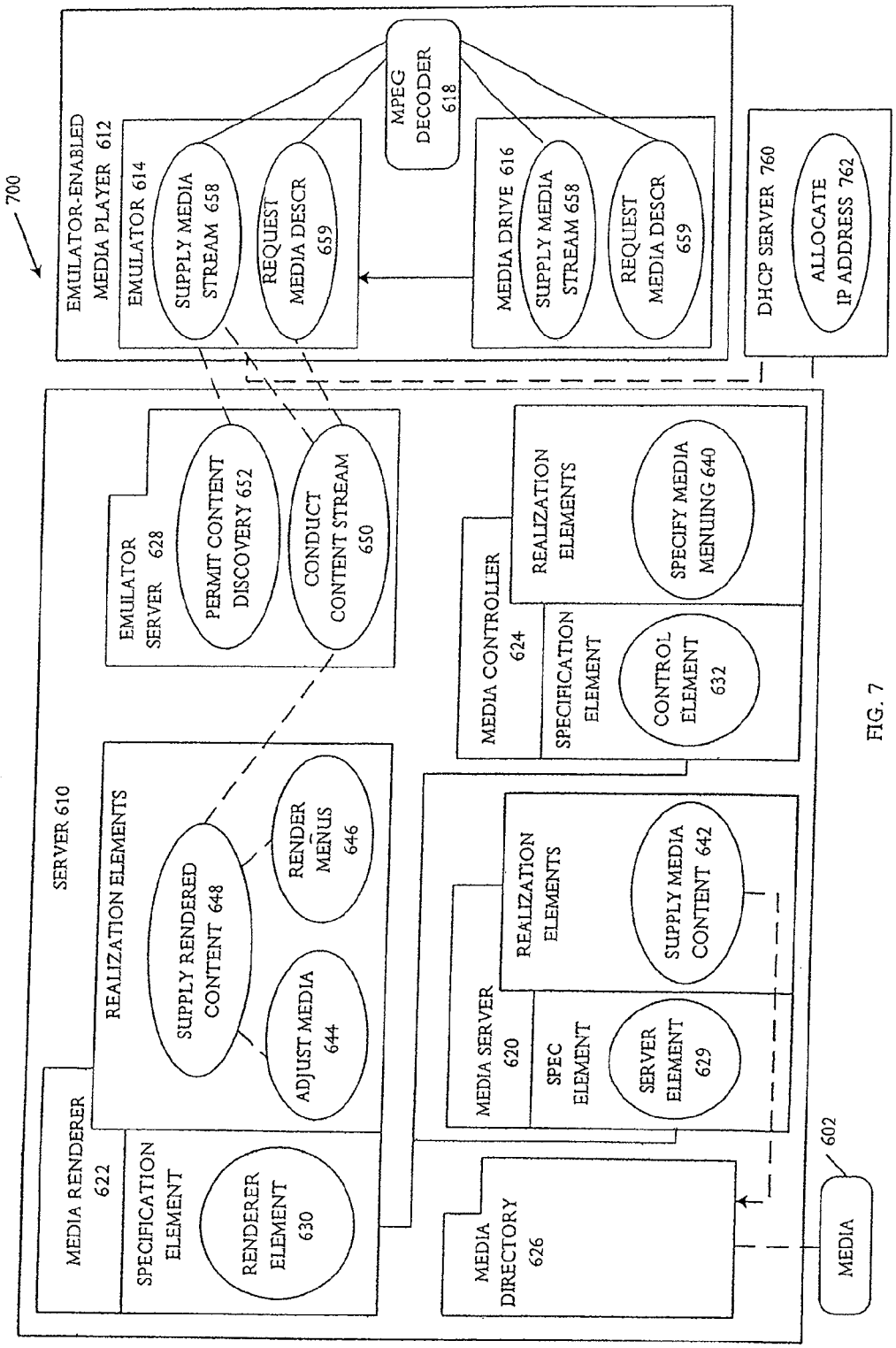
FIG. 7 is a use case diagram that illustrates functionality of an audiovisual system that uses an alternative embodiment of an emulator interface.

In an alternative embodiment shown in FIG. 7, the system may include a Dynamic Host Configuration Protocol (DHCP) server 660 that supplies a framework for passing configuration information to hosts on a TCPIP network, based on a Bootstrap Protocol (BOOTP) that is known to those of ordinary skill in the art of network communication. The DHCP server 660 adds a capability to automatically allocate reusable network addresses and additional configuration options 762. DHCP captures the behavior of BOOTP relay agents to enable DHCP participants to interoperate with BOOTP participants.

Figure 8:
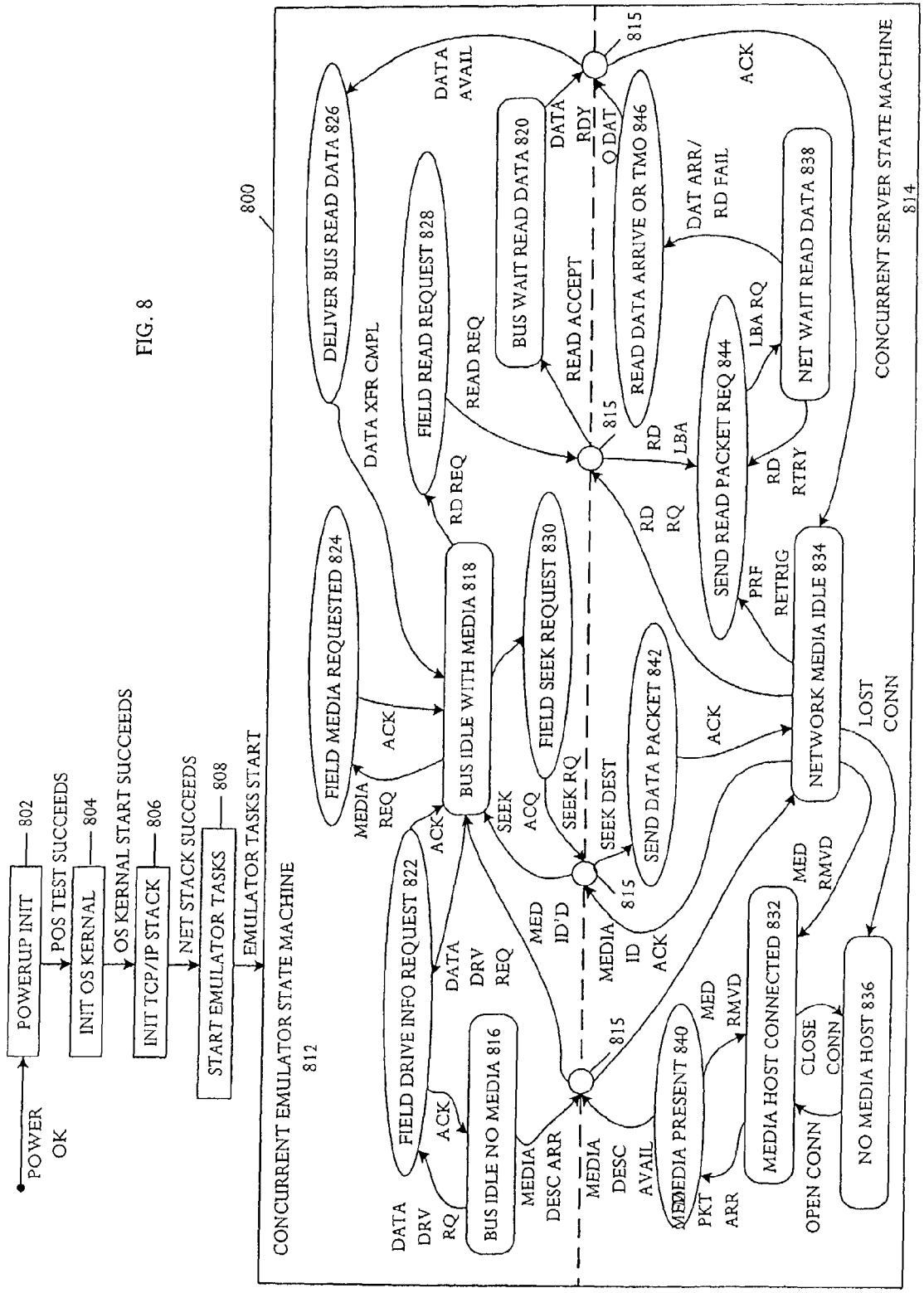
FIG. 8 is a detailed state diagram illustrating an example of functionality of a suitable emulator.

Referring to FIG. 8, a detailed state diagram illustrates an example of functions performed by an emulator 800. In various embodiments, the emulator 800 may execute one or more of a plurality of operations from various devices and components such as source devices, sink devices, or external devices. For example, the emulator 800 may execute some or all processes in the processor 314 in the emulator interface 306 depicted in FIG. 3.

In an emulation function, the emulator 800 generates control signals, data, and responses that deceive one or more of the source device, the sink device, and an external device as to the identity of the interacting device. In the sample of an optical media player with a network connection, an optical drive functions as a source, an optical media decoder serves as sink, and a remote computer operates as an external device. The emulator 800 can trick the devices so that the optical media decoder can render content from the remote computer in an interaction identical to an optical drive transaction. The optical drive can source content for the remote computer in an interaction identical to sourcing to the optical media decoder. For a writeable drive, the remote computer can source content for the optical drive in an interaction identical to writing to the drive from a bus.

Emulator 800 begins operation with a power-up initialization of hardware act 802 that proceeds when hardware tests are successful. Next an initialize operating system kernel act 804 initializes operation software. An initialize TCP/IP stack act 806 prepares an Ethernet stack for communication. A start emulator tasks act 810 commences operation of the emulator 800 including an emulator state machine 812 and a server state machine 814 that execute concurrently and synchronize at sync points 815.

The illustrative emulator state machine 812 has three wait states including a bus idle with no media 816, a bus idle with media state 818, and a bus wait read data state 820. The illustrative emulator state machine 812 has five command action states including a field drive information request state 822, a field media request state 824, a deliver bus read data state 826, a field read request state 828, and a field seek request state 830.

The illustrative server state machine 814 has four wait states including a media host connected state 832, a network media idle state 834, a no media host state 836, and a network wait read data state 838. The illustrative server state machine 814 has four action states including a media present state 840, a send seek packet state 842, a send read packet request state 844, and a read data arrives or timeout state 846.

The no media host state 836 advances to the media host connected state 832 when a media connection is open but returns when the connection is closed. Similarly, the network media idle state 834 returns to the no media host state 836 when a media connection is lost. The media host connected state 832 advances to the action media present state 840 when a media packet arrives but returns when the media is removed. When a media description is available, the emulator state machine 812 advances to the bus idle with media state 818 as the media is identified. The bus idle with media state 818 advances to the field drive information request state 822 upon a drive data request and returns on an acknowledge. The bus idle with media state 818 advances to the field media request state 824 upon a media request and returns on an acknowledge. The bus idle with media state 818 advances to the field read request state 828 on a read request, generating a read logical block address (LBA) signal that places the server state machine 814 in the send read packet request state 844. On a logical block address (LBA) request, the server state machine 814 advances from the send read packet request state 844 to the network wait read data state 838 and returns on a read retry. In the network wait read data state 838, the server state machine 814 advances to the read data arrives or timeout state 846 and, on a queue data signal, places the emulator state machine 812 in the deliver bus read data state 826. On a data transfer complete signal, the emulator state machine 812 enters the bus idle with media state 818 from the deliver bus read data state 826.

The bus idle no media state 816 of the emulator state machine 812 advances to the field drive information request state 822 upon a drive data request and returns on an acknowledge. The bus idle no media state 816 signals the server state machine 814 when a media descriptor arrives, generating a media ID acknowledge that places the server state machine 814 in the network media idle state 834. The network media idle state 834 in the event of a bus seek request generates a seek acknowledge that places the emulator state machine 812 in the bus idle with media state 818. The bus idle with media state 818 advances to the field seek request state 830 on a bus seek. The field seek request state 830 upon a seek request generates a seek destination signal that places the server state machine 814 in the send seek packet state 842 which goes to the network media idle state 834 on an acknowledge.

The network media idle state 834 upon a read request generates a read accepted signal that places the server state machine 814 in the bus wait read data state 820. When data is ready in the bus wait read data state 820, an acknowledge places the server state machine 814 in the network media idle state 834.

Emulator 800 can determine functionality of a particular sink device and specifically imitate that functionality for a remote device. In a particular example, the emulator 800 can imitate a disk drive by generating one track or stream of MPEG-2 at a constant bit rate or variable bit rate of compressed digital video. The particular emulator 800 may support constant or variable bit rate MPEG-1 CBR and VBR video at 525/60 (NTSC, 29.97 interlaced frames/sec) and 625/50 (PAL, 25 interlaced frames/sec) with coded frame rates of 24 fps progressive from film, 25 fps interlaced from PAL video, and 29.97 fps interlaced from NTSC video. Interlaced sequences can contain progressive pictures and macroblocks. The emulator 800 can place flags and signals into the video stream to control display frequency to produce the predetermined display rate. The emulator 800 can control interlacing, progressive frame display, encoding, and mixing. The emulator 800 can display still frames encoded as MPEG-2 I-frames for a selected duration, and can generate a plurality of subpicture streams that overlay video for captions, sub-titles, karaoke, menus, and animation.

The emulator 800 imitates a device that sources content by exhibiting the file system and methods of communicating with the file system of the source device. During initiation of a source-sink interaction, a system searches for contact on a source device. The emulator 800 mimics the file structure and content search of the source device in a remote device, permitting selection of content from either the actual source device or the remote device emulating the source device.

In a particular example, the emulator 800 emulates a file system such as a Universal Disk Format (UDF) or micro UDF file system and may support both write-once and rewritable formats. In some examples, the emulator 800 can support a combination of UDF, UDF bridge (ISO 9660), and ISO 13346 standards to ensure compatibility with legacy operating systems, players, and computers.

If an emulated transaction is selected, the emulator 800 manages the transaction by exchanging requests and data according to the protocols of a source-sink transaction. The emulator 800 also isolates the source device, intercepting and overriding control signals and data communicated by the source device and permitting signals and data interactions between the sink and the remote device as the emulated source. In various systems and transactions, the emulator 800 can imitate a transaction without notification of the sink device. In other systems and transactions, the emulator 800 can convey information to the sink device that indicates that emulation is occurring and identifying the actual remote content source, allowing additional control of network interactions, exploiting any additional capabilities of the remote device, and expanding rendering capabilities. For example, the emulator 800 can control a transaction to allow simultaneous rendering of content from the source device and an emulating remote device. One specific capability is a picture-in-picture display of source content and remote content.

Another specific capability is enhanced web-enabled DVD that extends capabilities to combine content from a DVD with special network-accessed applications.

Software or firmware that is executable by the emulator 800 may include many functions such as media content navigation, user interfacing, servo firmware, and device drivers.

Figure 9:
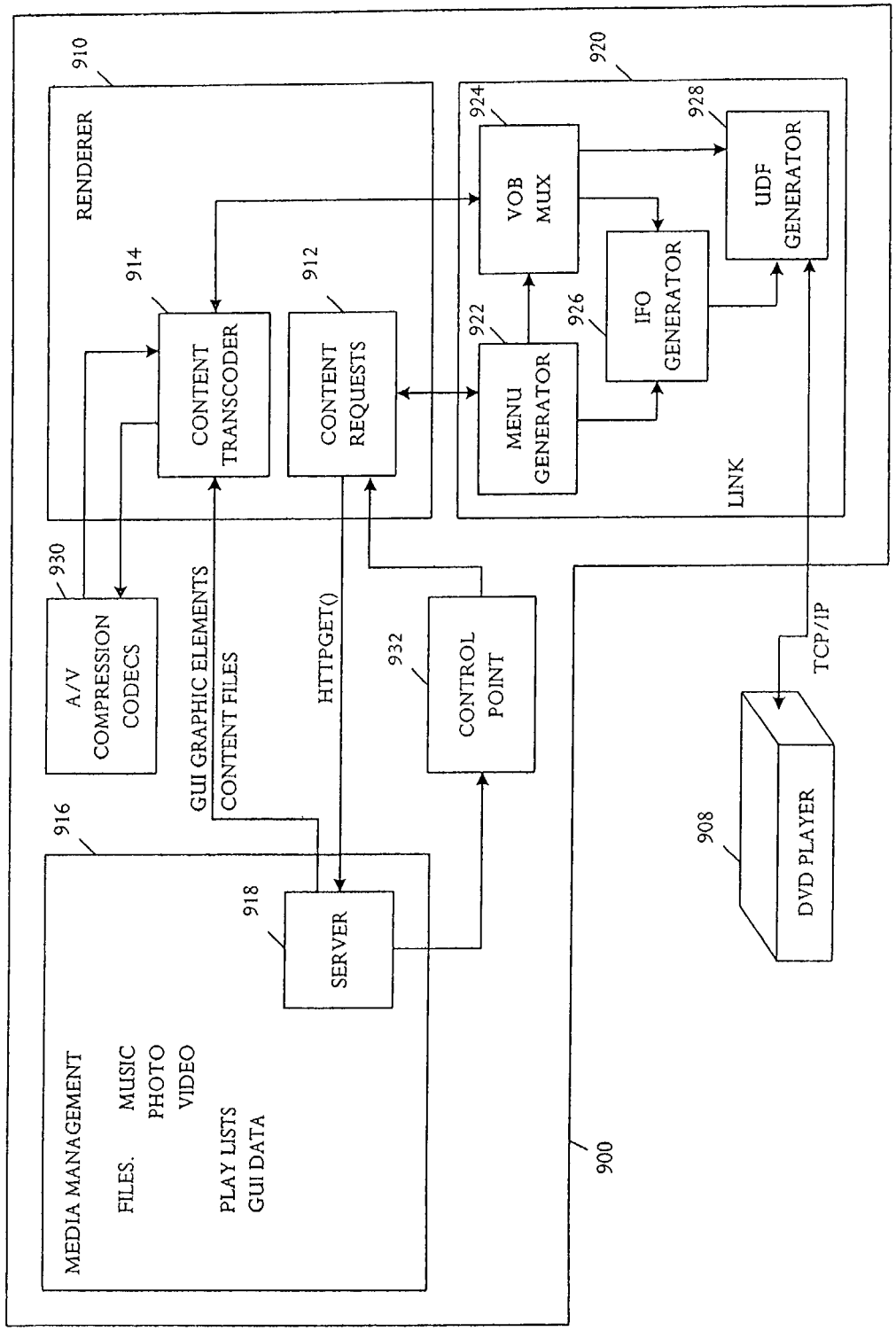
FIG. 9 is a schematic block diagram showing one example of an audiovisual system that includes emulation.

An emulator can be implemented in many forms. FIG. 9 shows one example of an audio-visual system that includes personal computer (PC) based software 900 executable on a personal computer and capable of interacting with an audio-visual device such as a DVD player 908. In the example, PC-executable software 900 comprises a server 918, a renderer 910, and a control point 932. The DVD player 908 includes an emulator (not shown) that may be implemented, for example, according to the description of FIG. 4, and the PC-based software 900 further comprises an interface or link 920 that supplies information to the emulator in a suitable format. The PC-based software also comprises audio-visual compression codecs 930, for example Windows A/V compression codecs, for coding and decoding information in various formats in conjunction with a content transcoder 914 in the renderer 910.

In the illustrative example, the server 918 can be implemented as part of media management software 916 that supplies content in various formats for access by the server 918. For example, the media management software 916 may supply various types of content files including music files, photo files, video files, and others. Music files may have formats such as MP3, WMA, and others. Photo files may have formats including JPG, TIFF, GIFF, and others. Video files may have formats including MPG, WMV, DIVX, and others. The media management software 916 may also supply play lists and graphical user interface (GUI) information such as navigation information and graphic elements.

The renderer 910 may comprise a content transcoder 914 and a content request handler 912. The server 918 can supply GUI graphic elements and content files to the content transcoder 914 for transcoding, according to various parameters, such as frame rate, sample rate, NTSC/PAL information, and the like, determined by the transcoder 914 in association with a VOB multiplexer 924 in the link 920. The content request handler 912 requests content from the server 918 via call such as a HTTPGet( ) command.

The control point 932 requests information from the server 918 using commands such as Simple Object Access Protocol (SOAP) commands in the eXtended Markup Language Transmission Control Protocol (XML TCP) protocol. The server 918 can respond with Unified Resource Identifiers (URIs) for play lists and content. The control point 932 transfers the URIs to the content request handler 912 in the renderer 910.

The link 920 can comprise a menu generator 922, a VOB multiplexer 924, an IFO generator 926, and a UDF generator 928 that function, for example, as described in the discussion of FIG. 5. The link 920 can communication with the A/V device 908 using a protocol such as TCP/IP.

Figure 10:
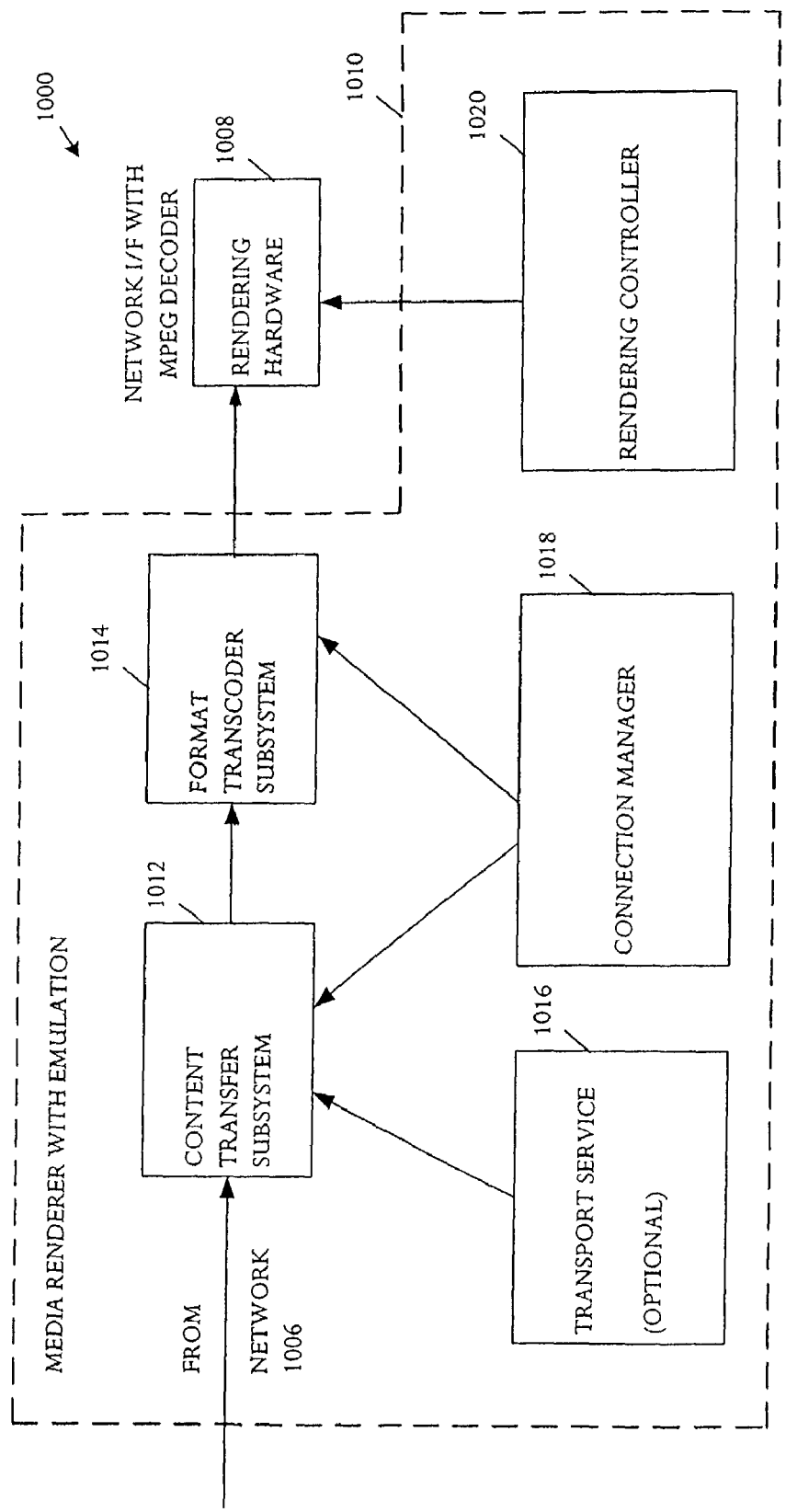
FIG. 10 is a schematic block diagram illustrating another implementation of an audio-visual system that includes emulation to extend rendering functionality.

Referring to FIG. 10, a schematic block diagram illustrates another implementation of an audio-visual system 1000 that includes emulation to extend rendering functionality. The audio-visual system 1000 includes a media renderer with emulation 1010 and network-enabled rendering hardware 1008. The media renderer 1000 comprises rendering hardware 1008 and the media renderer with emulation 1010. In the illustrative system, the media renderer 1000 can be a media decoder in combination with a communication interface. In a specific example, the rendering hardware 1008 can be an MPEG decoder coupled to a network interface and an emulator interface. The media renderer with emulation 1010 is a computer in any form or a workstation that is capable of receiving information or media content from a network 1006.

In some systems, the rendering hardware 1008 has only a conventional capability to render native format content but is supplemented with a network interface that enables receiving of content from an alternative source, local or remote. The renderer with emulation 1010 receives content in various formats from a network 1006 and converts the format of the content, if needed, for rendering by the rendering hardware 1008. The renderer 1010 extends functionality by inclusion of a format transcoder subsystem 1014 that can transcode content from virtually any format to the native format of the hardware renderer 1008. The format transcoder subsystem 1014 can transcode any supported format into the native format capable of handling by the rendering hardware 1008.

In one example, the media renderer with emulation 1010 can be implemented using a computer-based proxy model in which the rendering function is supported by the computer, for example a personal computer (PC). The renderer 1010 can support any content format that the computer can transcode. In some embodiments, a control point function can also be proxied by the PC. The PC can supply a control point user interface, for example as a DVD menu. A DVD remote controller can then be used to select content. Once the content is selected, the control point is idle.

The transport service 1016 is typically optional and controls some content transfer subsystem operations, typically playback operations such as stop, pause, seek, and the like. The connection manager 1018 supports the content transfer subsystem 1012 and the format decoder subsystem 1014 and controls connections associated with a particular device including preparation to receive an incoming transfer, flow control, and support of multiple simultaneous renderers. The rendering controller 1020 interacts with the rendering hardware 1008 alone and enables control of the rendering hardware 1008 rendering of particular content. In a DVD application, the rendering controller 1020 controls rendering characteristics such as contrast, brightness, volume, mute, and the like. Functions such as handling of multiple, dynamic instances enables functionality such as picture-in-picture.

The media renderer with emulation 1010 can include a content transfer subsystem 1012 that can receive content from the network 1006, and a format transcoder subsystem 1014 The format transcoder subsystem 1014 detects the format of the received content, determines whether the content format is supported by the rendering hardware 1008 and, if not, transcodes the content into a supported format. Software programs that execute in the renderer 1010 control information transfer, transcoding, and the rendering hardware 1008. In the illustrative system, a connection manager 1018 controls accessing and receipt of content from the network 1006 through operations of the content transfer subsystem 1012, and controls transcoding definition and activation through operations of the format transcoder subsystem 1014. A rendering controller 1020 sends signals to the rendering hardware 1008 to set rendering parameters to control rendering of incoming content and initiate rendering operations.

The renderer 1010 can identify the content formats supported by the rendering hardware 1008 during initialization. Upon accessing content on the network 1006, the renderer 1010 analyzes the network content and determines the received content format. If the received content format is not supported by the rendering hardware 1008, the format transcoder subsystem 1014 is initialized and activated to transcode the received content into a supported format.

The emulating renderer 1010 may be implemented in various forms. For example, the renderer 1010 may be implemented as a self-contained board or integrated circuit that can be installed in a computer system. The various functional elements may be implemented as hardware, firmware, software, other technologies, or various combinations. In some examples, a portion of the renderer 1010 may be implemented as a board or integrated circuit, and a portion could be implemented is software that executes from one or more processors in a computer system.

Figure 11:
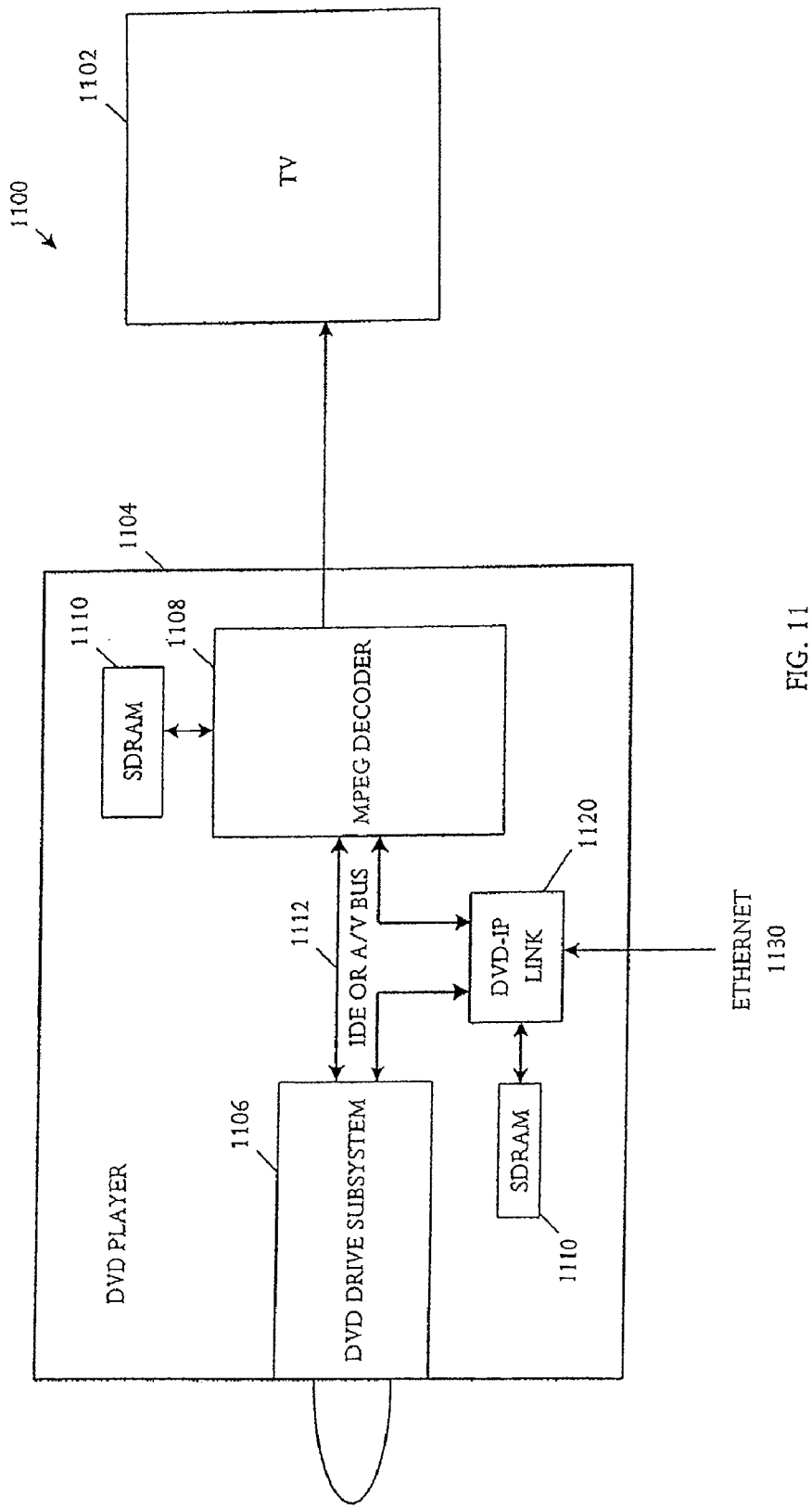
FIG. 11 is a schematic mixed block and pictorial diagram that depicts an example of an application for an emulator.

Referring to FIG. 11, a schematic mixed block and pictorial diagram depicts an example of an application for an emulator 1120. A DVD audio-visual system 1100 includes a DVD player 1104 and a television 1102. The DVD player 1104 has several conventional functional elements including a DVD drive subsystem 1106, an MPEG decoder 1108, and a memory 1110. The DVD drive subsystem 1106 sources content for rendering. The MPEG decoder 1108 receives content from the DVD drive subsystem 1106 via a bus 1112, for example an IDE or A/V bus, and renders the content for presentation on the television 1102 or other video screening device.

Functional capabilities of the DVD audio-visual system 1100 are substantially increased by adding the emulator 1120 to supply content from a nearly infinite number of sources by operating as a network interface. The emulator 1120 is coupled into the bus 1112 to function as a DVD to Internet Protocol (IP) link to Ethernet 1130.

Figure 12:
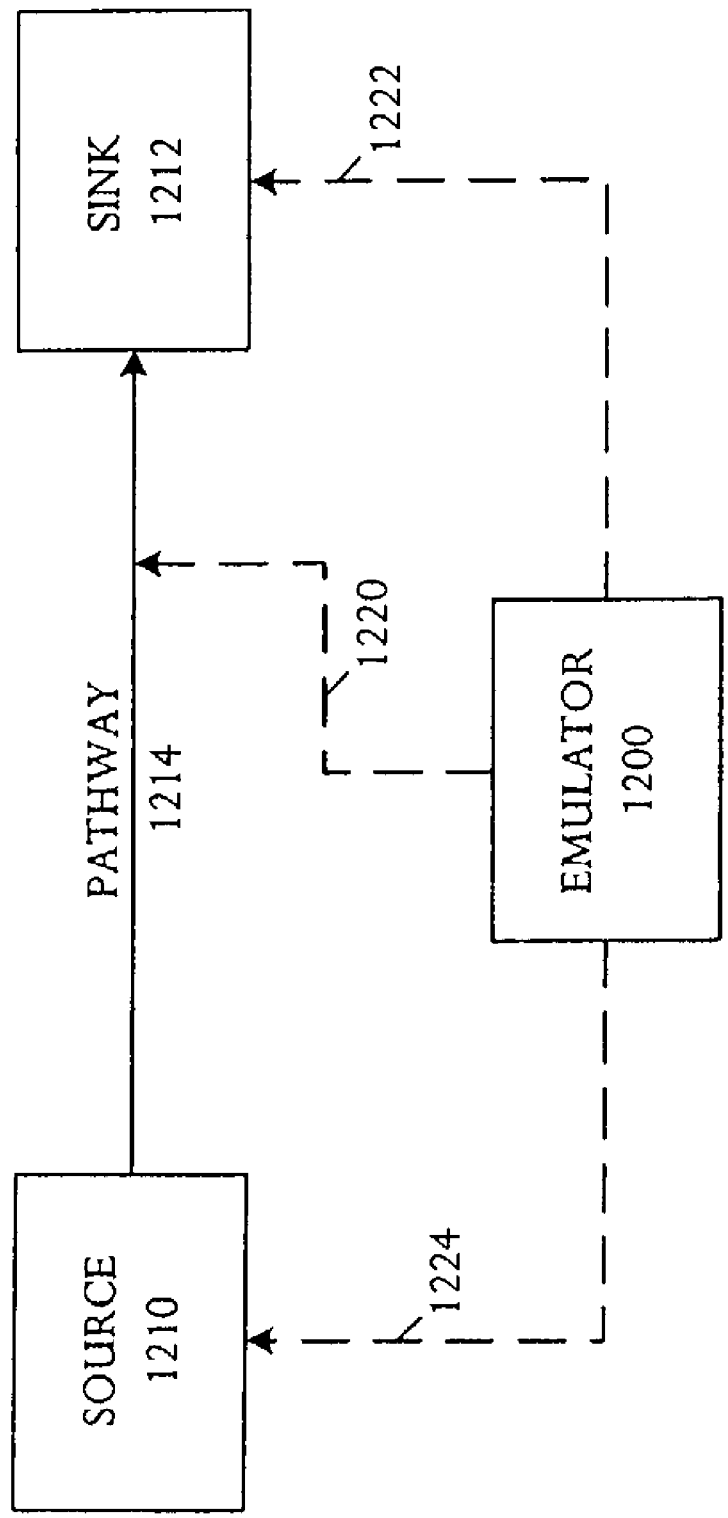
FIG. 12 is a schematic block diagram showing various connections that can be made between an emulator and a communication system that includes a source, a sink, and a pathway for communicating from the source to the sink.

Referring to FIG. 12, a schematic block diagram illustrates various connections that can be made between an emulator 1200 and a communication system that includes a source 1210, a sink 1212, and a pathway 1214 for communicating from the source 1210 to the sink 1212. The emulator 1200 can have multiple links for coupling to buses, devices, processors, and components including, for example, bus connections, Ethernet media access control (MAC) links, serial links, parallel links, memory controller links, direct memory access (DMA) links, parallel I/O (PIO) links, register interfaces, shared RAM interfaces, radio frequency links, universal serial bus (USB) links. Accordingly, the emulator 1200 can directly or indirectly tap or connect to any of the source 1210, the sink 1212, and the pathway 1214.

One type of link 1220 connects the emulator 1200 to the pathway 1214, typically as a bus interface. The pathway 1214 can be a nonstandard bus or may be one of several various standard buses such as Integrated Device Electronics (IDE), audio/visual (A/V), advanced technology attachment packet interface (ATAPI), Small Computer Systems Interface (SCSI), or other buses. The link 1220 can be a standard bus connection to a standard bus such as a TAPI connection and can emulate a device at the physical level or logical level.

A link 1222 from the emulator 1200 to the sink 1212 is commonly a non-tapi connection such as a physical interface through a media access control (MAC) module. The sink 1212 can be any type of rendering device such as an MPEG decoder, electronic picture frame, audio player, and other display device. Sink devices 1212 can also be various other devices and components such as computers, work-stations, laptop computers, calculators, palm computers, mobile telephones, televisions, video cassette recorders, compact disk (CD) or digital versatile disk (DVD) players and recorders, jukeboxes, karaoke devices, camcorders, set-top boxes, MP3 players, still-image cameras, remote control devices, control panels, televisions with embedded MPEG decoders, personal video recorders (PVRs), and other control devices and information storage, retrieval, and display devices.

Emulation directly at the sink 1212 is commonly at the logical level.

A link 1224 from the emulator 1200 to the source 1210 is commonly a non-tapi connection such as a physical interface through a media access control (MAC) module. The source 1210 can be any type of information supplying device such as a DVD drive, CD drive, CD-ROM drive (CD-R, CD-R/W), or can also be a hard disk drive, tape drive, tape library, and the like. The source device 1210 can also be various other devices and components such as remote network storage facilities, computers, workstations, laptop computers, calculators, palm computers, mobile telephones, and other retrieval devices.

Emulation at the source 1210 is commonly at the logical level. Emulation at the source 1210 can have a connection at any entry position including, but not limited to, a memory interface, a processor interface, a disk data interface, an input interface such as a pickup head on a data channel, a serial interface, a parallel interface, a GPIO port, and the like.

Figure 13:
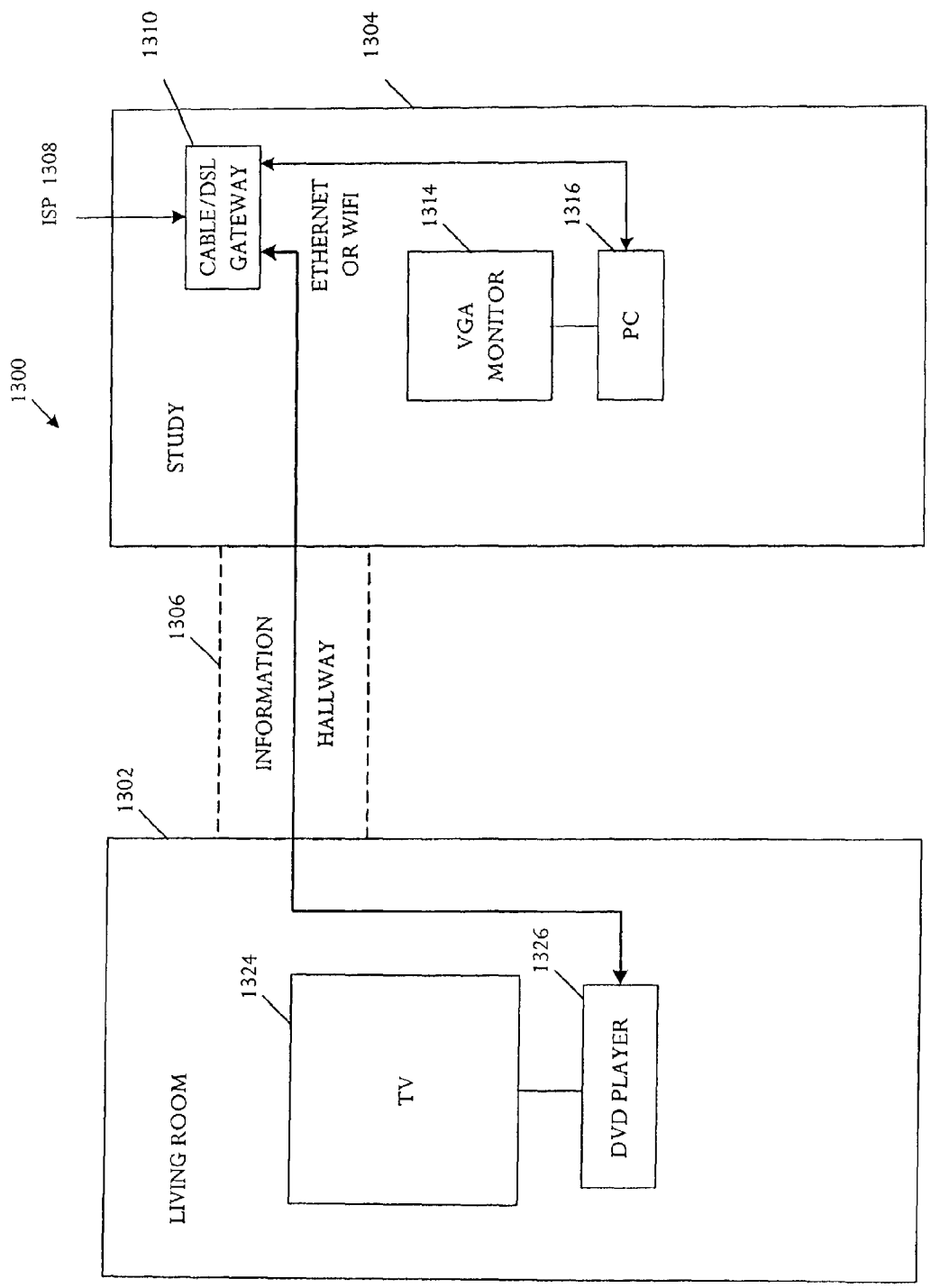
FIG. 13 is a schematic block diagram illustrating an information hallway application of an emulator that is configured to function as part of a cable/DSL gateway.

Referring to FIG. 13, a schematic block diagram illustrates an information hallway application 1300 of an emulator 1310 that is configured to function as part of a cable/DSL gateway. The illustrative application 1300 utilizes the emulator 1310 to network various types of devices in multiple rooms, for example a living room 1302 and a study 1304 in a household via an information hallway 1306. In some examples, the information hallway 1306 can be via Ethernet, wireless (e.g. IEEE 802 Standards Working Groups), or other suitable network connections.

In this example, the living room 1302 contains entertainment devices and appliances such as a television 1324 and DVD player 1326. The study 1304 contains computing and communications equipment such as a cable/DSL gateway that may incorporate the emulator 1310, a personal computer 1316, and a VGA monitor 1314 functioning as a display screen for the PC 1316. In other embodiments, the emulator 1310 may be contained in other devices or equipment, such as the PC 1316. The cable/DSL gateway enables networking with remote systems, here via an Internet Service Provider (ISP) 1308.

Broadband Internet enables access to a wide variety of video and musical content over the Internet. Various usage models are well-established for music, including compressed content download via the Internet for usage on other playback devices such as portable MP3 and CD players. Various computer suppliers support MP3 players, mixing the concepts of computing and entertainment since Ethernet and phone networked connected MP3 decoders are intended for entertainment usage as part of a home stereo system.

The information hallway 1306 enables communication of all types of content between different rooms and various entertainment, computing, and communication usages. Media no longer needs to be carried from room-to-room. The emulator 1310 enable access of all content throughout the house or even remote from the house. Low cost wireless 802.11 (WIFI) facilitates content sharing for homes that are difficult to wire and enable content transfer to a car while parked in the garage or nearby.

A similar usage model is developing for Internet video content with hundreds of thousands of video titles now available for download and encoded from commercial video broadcasts, VHS tape, VCD, DVD, amateur, and home video. Movie studios are making premium movies available for purchase and per-per-view download over the Internet, encoded to reduce size to a few hundred megabytes with near DVD quality.

One problem solved by the emulator 1310 is facilitating downloaded movie access to the television 1324. In addition to assisting content access, the emulator 1310 also can transcode content to meet requirements of the devices rendering the content. The emulator 1310 can also implement digital rights management functionality to permit content transfer only when authorized.

In some embodiments, volatile memory in the emulator 1310 is implemented with a large capacity so that the DVD player can present video information without glitches. A large memory size has increased importance for communication connections that are less reliable. Generally, a volatile memory size of 8 megabytes may be sufficient for a highly reliable communication connection. A memory capacity of 64 or 128 megabytes may be more suitable for less reliable interconnections. An increase in storage operates analogous to an increase in bandwidth for a system that accesses media content over a network.

Suitability of memory capacity in a particular configuration also depends on the data transfer rate of the communication connection. If the data transfer rate is smaller than the rate that the emulator 1310 supplies data to a video display, then the video information can be stored in the volatile memory for all or a part of a video presentation. In one example, if the video presentation rate exceeds the communication rate, a sufficient amount of video information can be stored before beginning presentation so that presentation of the video information does not outpace the continuing video information transfer.

The emulator 1310 enables a user to search, find, and download content from any of a computer, an entertainment device or appliance, or a network and view the content in any of multiple desired locations.

With addition of the emulator 1310, the PC 1316 can operate in the background as a "communication facilitator" and "content formatter." Additional functionality made possible by the emulator 1310 includes extending consumer access to "open" and "premium" content. Combining functionality of the PC 1316 and the DVD player 1326 facilitates usage since familiarity of DVD player menu interface is extended to content access from the PC 1316 and the network or Internet since the extended system uses the same remote control and menu features of DVD system. The combined system also improves flexibility to operate with any broadband internet service, supplying simple integration for Ethernet, 1394, wireless standards such as IEEE 802 Standards Working Groups and Bluetooth, or any other connectivity into a low-cost DVD player.

In some applications, manufacturers and original equipment manufacturers (OEMs) can implement the emulator 1310 using only a simple PCB level change to avoid impacting existing system components or firmware, if desired.

The emulator 1310 can supply functional basis for an Ethernet MPEG receiver that serves as a PC to television link. The emulator 1310 can be used to widely expand functionality of existing products that contain MPEG decoders such as digital cable and satellite set top boxes, PVRs, game consoles, and DVD players.

An Ethernet MPEG receiver comprises an MPEG decoder, an interface to the MPEG decoder, and an emulator for converting information from a non-standard form to a form expected from a standard media drive. The Ethernet MPEG receiver creates a link from a personal computer (PC) 1326 to television (TV) 1324 so that a user can search for and download content from either the PC or the TV and view the content in either location. The Ethernet MPEG receiver is a logical interface that supplies data to the MPEG decoder in an expected format so that the PC performs the function of supplying data in the format expected by the interface device.

In some applications, the emulator 1310 can be used to connect a PC and DVD player via Ethernet to enable users to search and play content using either device seamlessly.

In some embodiments of the emulator 1310, resources of the computer can be used to download and transcode content for streaming playback on the television using the MPEG decoder of the DVD player.

In some embodiments, the user interface for the DVD player can remain unchanged and the DVD remote control can be used for Internet video playback control in the manner of DVD disc playback usage.

Figure 14:
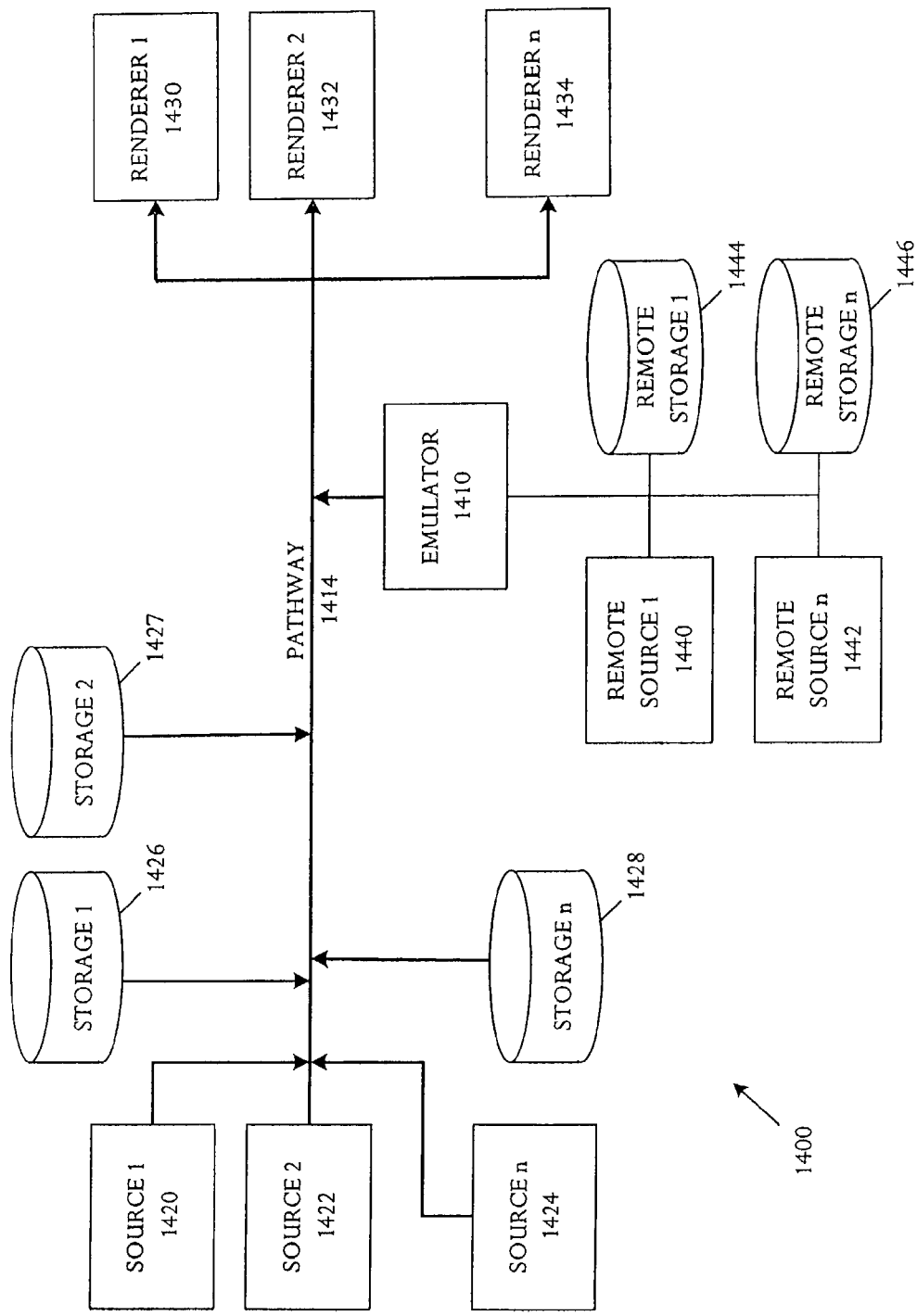
FIG. 14 is a schematic block diagram showing an example of a multiple-media receiver/recorder comprising an emulator that functions as an input selector or media switch.

Referring to FIG. 14, a schematic block diagram illustrates an example of a multiple-media receiver/recorder 1400 comprising an emulator 1400 that functions as an input selector or media switch coupled via a pathway 1414, for example a bus, to one or more renderers 1430, 1432, 1434. The emulator 1410 can select media content from media sources 1420, 1422, 1424 or media storage elements 1426, 1427, 1428 that are internal to a device or system such as a set top box or receiver/recorder. Some devices or systems may omit internal media sources and/or internal media storage elements. The emulator 1410 can also access media content from network devices connect via a network interface, for example remote sources 1440, 1442 or remote storage elements 1444, 1446.

The emulator 1410 accesses input signals, for example in the form of video input streams from one or more sources. Various forms of video signal forms include, for example, National Television Standards Committee (NTSC) or PAL broadcast formats, and digital formats based on Moving Pictures Experts Group 2 (MPEG2) and MPEG2 Transport standards such as Digital Satellite System (DSS), Digital Broadcast Services (DBS), or Advanced Television Standards Committee (ATSC). The MPEG2 Transport standard formats a digital data stream from an analog television source transmitter, allowing a television TV receiver to disassemble the input signals to find particular programs in a multiplexed program signal.

For signals that are in a format that can be rendered by a selected renderer 1430, 1432, or 1434, the emulator 1410 passes through the signals to the renderer unaltered. For signals that are not in a suitable rendering format, the emulator 1410 reformats or transcodes the signals to the suitable format, for example MPEG streams. An MPEG2 transport multiplex supports multiple programs in the same broadcast channel, with multiple video and audio feeds and private data. The emulator 1410 can tune the channel to a particular program, extracts a particular MPEG program, and transmit the MPEG signals to the pathway 1414 for rendering by the selected renderer.

The emulator 1410 can encode analog television signals into an MPEG format using separate video and audio encoders in a manner transparent to the system. The emulator 1410 may modulate information into Vertical Blanking Interval (VBI) of the analog TV signal using one or more of multiple techniques. North American Broadcast Teletext Standard (NABTS) may be used to modulate information onto lines 10 through 20 of an NTSC signal, using line 21 for Closed Caption (CC) and Extended Data Services (EDS). Signals can be decoded by the emulator 1410 and passed to renderers in the manner of MPEG2 private data channel delivery.

The emulator 1410 can mediate signals between multiple internal media sources 1420, 1422, 1424 and media storage elements 1426, 1427, 1428 and multiple external remote sources 1440, 1442 and remote storage elements 1444, 1446, as well as from internal or external processes and memory.

The emulator 1410 can convert input streams, for example to an MPEG stream, and sent to the pathway 1414. The emulator 1410 can buffer the MPEG stream into memory. The emulator 1410 can perform two operations if a user is watching real time TV. The emulator 1410 can send the stream to a renderer, for example renderer 1420, and simultaneously write the stream to a storage, for example storage 1426 such as a hard disk drive.

The renderer 1420 receives MPEG streams as an input signal and produces an analog television signal according to the NTSC, PAL, or other standards. The renderer 1420 commonly may contain an MPEG decoder, On-Screen Display (OSD) generator, analog TV encoder and audio logic. The OSD generator enables program logic to generate images for overlay on the analog television signal. The renderer 1420 can modulate information supplied by the program logic onto the VBI of the output signal in a number of standard formats, including NABTS, CC and EDS.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the invention. Variations and modifications of the embodiments disclosed herein may be made based on the description set forth herein, without departing from the scope and spirit of the invention as set forth in the following claims.

In the claims, unless otherwise indicated the article "a" is to refer to "one or more than one".

What is claimed is:

1. A computer system comprising:
   a network controller;
   an emulator interface controller coupled to the network controller;
   an emulator processor coupled to the emulator interface controller and configured to emulate a storage device from information received from a network via the network controller;
   a content bus interface coupled to the emulator interface controller; and
   a format transcoder executable on the emulator processor that initiates content transfers by creating a navigation logfile containing frame identification and a related group of picture lists with file offsets.

2. The computer system according to claim 1 wherein the emulator interface controller is configured to couple to a computer bus and emulate bus data and control signals of the storage device.

3. The computer system according to claim 2 wherein the emulator interface controller executes on the emulator processor and is configured to execute multiple functions including control, data transfer, emulation, transcoding, data storage, interfacing, and test.

4. A computer system according to claim 2 further comprising:
   a memory coupled to the emulator interface controller and storing data and program code executable on the emulator processor including program code for emulating bus data and control signals of a host, program code for emulating bus data and control signals of a device, and program code for selecting and seamlessly combining communication of actual bus data and control signals and emulated bus data and control signals on the computer bus.

5. A computer system according to claim 1 wherein the format transcoder executes one or more of a plurality of operations including:
   initiating content transfers;
   selectively activating modules that transfer, manipulate, and buffer audio and video streams; and
   encoding frames.

6. A computer system according to claim 5, wherein:
   the format transcoder can selectively pass through audio and video streams without activating the transfer, manipulate, and buffer modules.

7. A computer system according to claim 6 wherein:
   the manipulate modules include modules that selectively manipulate video frames including:
   removing an arbitrary frame region for processing;
   de-interlacing a video frame;
   enlarging or reducing video width or height;
   filtering for image resizing;
   removing an arbitrary frame region for encoding;
   downsampling of video width and height;
   video frame flipping or mirror imaging;
   gamma correction;
   anti-aliasing; color manipulations; and
   the manipulate modules include modules that selectively manipulate audio frames including:
   volume changes;
   audio stream resampling; and
   synchronizing video and audio frames.

* * * * *